United States Patent
Kinner

[15] 3,656,510
[45] Apr. 18, 1972

[54] FLUIDIC SEQUENCE CONTROLLER

[72] Inventor: Hans-Dieter Kinner, Duxbury, Mass.

[73] Assignee: The Foxboro Company, Foxboro, Mass.

[22] Filed: Dec. 30, 1969

[21] Appl. No.: 889,210

[52] U.S. Cl..............................................137/608, 137/81.5
[51] Int. Cl.................................................F15c 1/10
[58] Field of Search..................137/81.5, 608; 235/201, 200

[56] References Cited

UNITED STATES PATENTS

| | | | |
|---|---|---|---|
| 3,250,285 | 5/1966 | Vockroth, Jr. | 137/81.5 |
| 3,364,342 | 1/1968 | Jakubowski | 235/201 X |
| 3,366,043 | 1/1968 | Fitch | 235/201 FS |
| 3,384,115 | 5/1968 | Drazan et al. | 137/608 |
| 3,407,834 | 10/1968 | Brandenberg | 137/271 |
| 3,420,254 | 1/1969 | Machmer | 137/81.5 |
| 3,472,259 | 10/1969 | Hatch, Jr. et al. | 137/81.5 |
| 3,503,411 | 3/1970 | Bauer et al. | 137/81.5 X |
| 3,516,436 | 6/1970 | Klaus et al. | 137/600 X |
| 3,526,723 | 9/1970 | Thomson | 137/81.5 X |

*Primary Examiner*—Samuel Scott
*Attorney*—Lawrence H. Poeton

[57] ABSTRACT

A sequencing controller, pure fluid device. Modular construction, highly flexible in the nature and complexities of its applications. Uses program punch card forms, fixed with respect to input and output. Operates on the basis of sensor response to actual situation in controlled process or energy. Coincidence device compares controller output and sensor response. Selective sequence station repeater. Multiple manifold unit and punch card structure between sequence and output modules. Plug-in modules, input and output fluidic circuit boards and punch cards readily replaceable, and process or energy sensors flexible in application.

25 Claims, 42 Drawing Figures

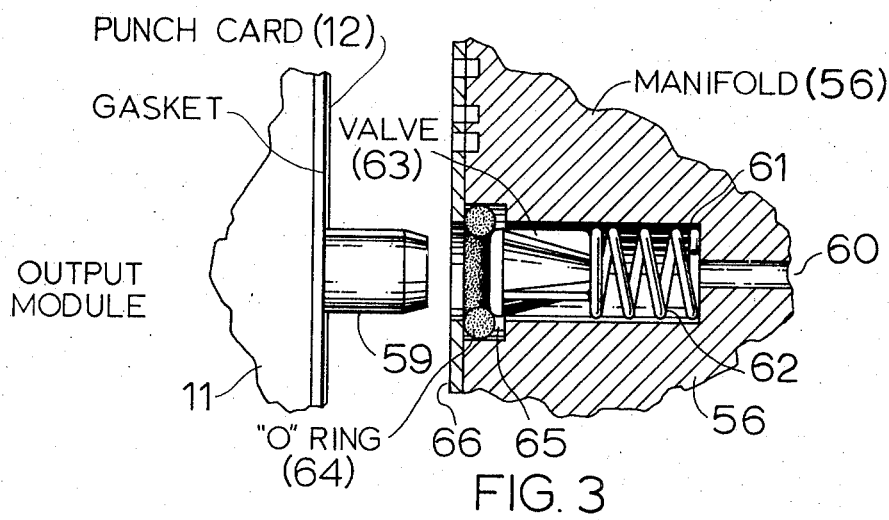
FIG. 3
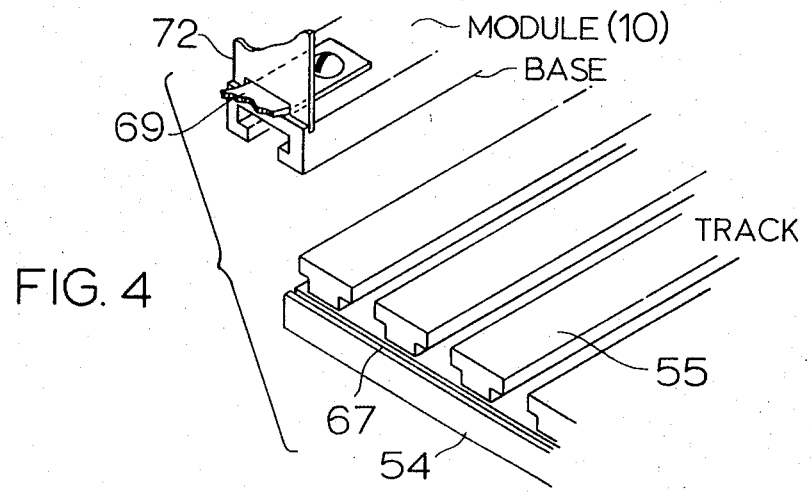
FIG. 4
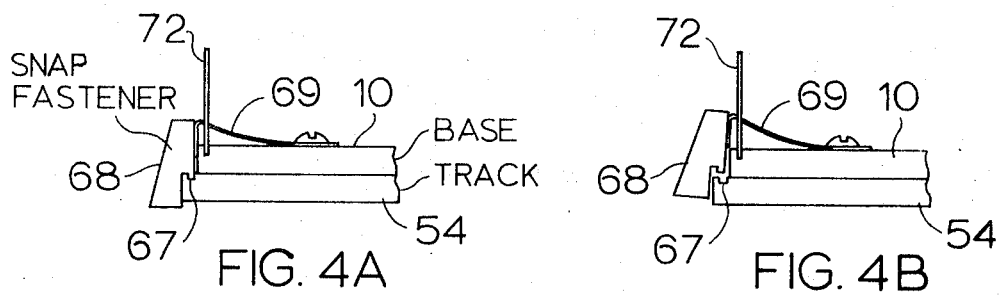
FIG. 4A
FIG. 4B

SEQUENCE (10)

CIRCUIT BOARD (74)(82)

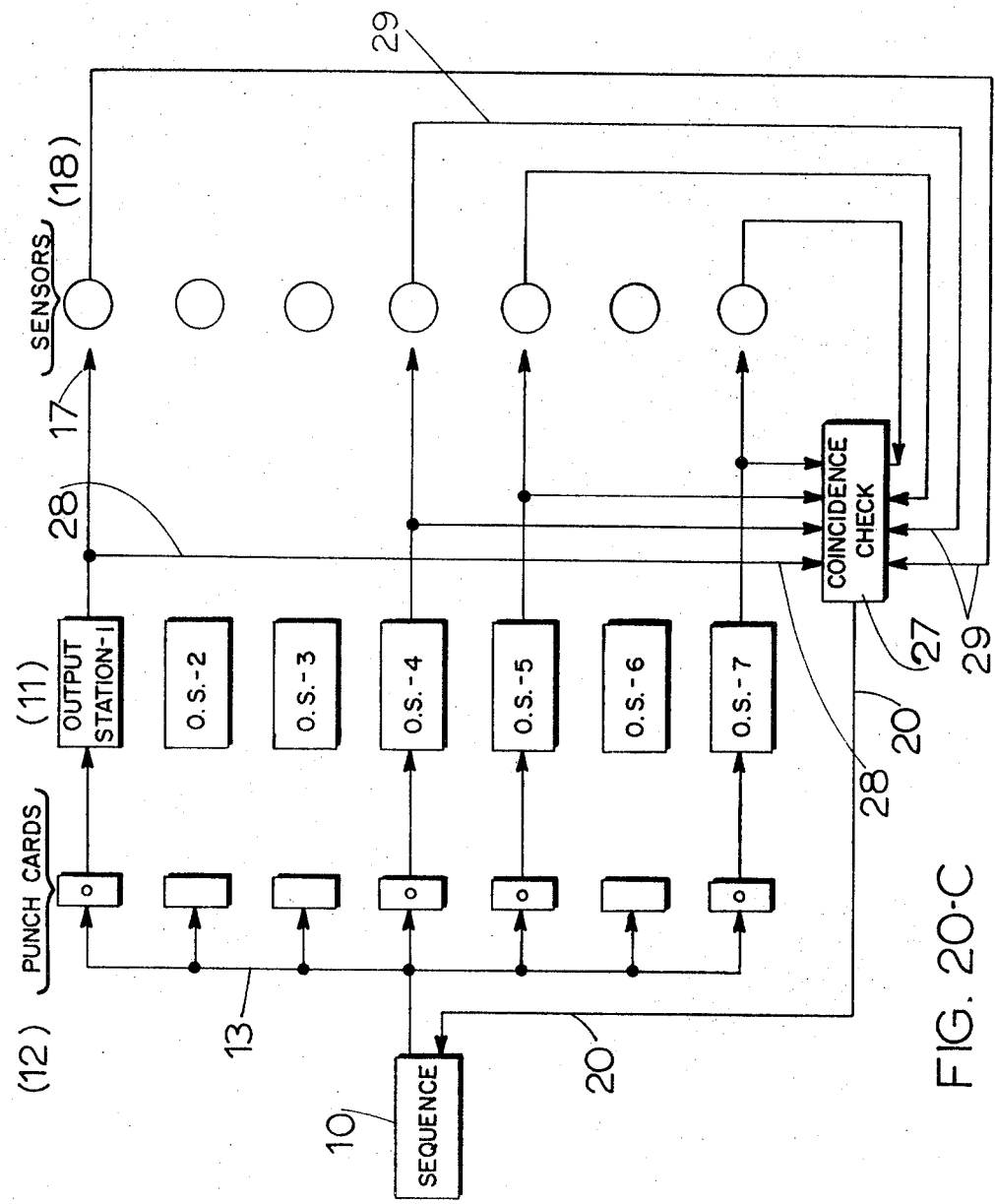
FIG. 20-C

FLUIDIC SEQUENCE CONTROLLER

This invention relates to sequencing of operational steps in process and/or energy control. More particularly, it relates to automatic, programmed control, and systems and devices therefor.

An important element in the combination system of this invention is the use, in a sequence system, of operationally fixed program matrix means, such as punch cards.

Program matrix means of such nature is disclosed in U.S. Pat. No. 3,472,259 to Hatch and Kinner. The abstract of this patent is as follows:

A fluid information system of the nature of a punch-card reader, used for example as a programmer for controlling industrial process parameters, wherein an information matrix of fluid passages is held fixed with respect to a fluid output system of readout passages. Each of the readout passages being individual to one of said matrix passages on an isolated gating basis, without feedback and without cross-contamination between said readout passages, means responsive to output signals from said output passages for producing operating signals representative of the information in said information matrix, and means for fluid scanning said information matrix to initiate said output signals by directing fluid through said passages in said information matrix.

Process and energy situations have developed in magnitude and complexity in such manner and extent as to require new and improved systems of control. In many cases this calls for programmed control such as automatic sequencing of control steps, often with each step involving several, often many, factors, parameters, or situations to be handled simultaneously at each sequence station.

In such control there is need for automatic confirmation of accomplishment as related to command signals. Thus, sensors need to be used with respect to the actualities of the process or energy under control. There can be a need for many such sensors used simultaneously at each sequence control step.

The variety of process and energy situations in which such sequence control is needed is endless. Handling and treatment of chemicals, manufacture of paper, transportation and treatment of water and gas, are only a few of the possible examples. One of the many possible further areas of need is in the control of automatic machine tools, grinding machines, and the like.

With such variety of application needs, a modern sequence controller must be highly flexible for adaptation to the different needs, and must be quickly and easily adaptable and changeable so as tO be relatable to any group of process or energy situations or parameters, particularly in the sense of handling many such situations or parameters at each single sequence step. Improper or delayed application of effective control can be highly expensive and dangerous, in terms of today's large quantity, high precision, and many faceted process and energy situations.

In addition to the general application needs, automatic and/or quickly applicable safety measures often need to be included in such a modern sequence controller. These include means for determining the actuality of process or energy situations in relation to the command signals from a controller.

This invention provides a sequence controller which readily meets all such needs. As a base element of its combination, it provides a fixed program matrix, without moving tapes, drums, fingers, scanning blocks, or the like. The consequent reduction in wear, avoidance of inaccuracies, and achievement of reproduceability without losing system integrity, is a substantial advance where the fixed matrix is combined with (as in this invention) a modular plug-in building block concept, process and energy situation sensor outputs as guides and controls for the sequencer, for example as a sequence step initiator, particularly when many such sensor outputs all must represent planned accomplishment before a signal to the sequencer can be sent, coincidence means for comparing the sensor output with related command signals, selectively applied repeat system means for the sequence stations of the controller, and other similarly useful adjuncts to the main system.

This invention thus provides an automatic, highly flexible fluidic, programmed, sequence control system, which lends itself to all the modern uses of pneumatic, usually air, systems and devices, with their advantages of simple, miniaturizable logic units and combinations, without moving parts, minimized external tubing connections, with further advantages of explosion-proof performance, low air consumption, reliability, and reproducibility while maintaining system and operational integrity.

The illustrative embodiment of this invention, as disclosed herein, sets forth usage of the simplicity of fluidic turbulence amplifiers as gates, in systems that are mainly digital for predictable, logic functions. Analog and/or digital process or energy situations are thus controlled mostly by digital means, although the concept of analog devices in the control system, or fluidic amplifiers or devices other than turbulence devices, where specifically needed, is not excluded.

Turbulence amplifiers, often herein used and described as fluidic gates, provide laminar fluid flow across an open space, diffusible by a transverse control signal to provide 'zero' output when diffused, a 'one' output when not diffused (no positive control signal).

In association with the structure of an operationally fixed but readily removable program matrix, punch card or holed program sheet or plate, the flexibility and adaptability of this invention is provided in the form of sequence modules (blocks) in various combinations with output modules (blocks) as operationally mounted with and connected through a manifold block.

Any number of such sequence station modules can be, in the concept of this invention, combined in plug-in fashion with any number of output modules, through plug-in mounting to a single manifold block unit.

Within each of such sequence and output modules as used in this invention, there is a spring held 'slide-in' fluidic system circuit board. In the area of the manifold block and between the sequence and output modules there is a program matrix 'punch-card' form. For any one module situation there is a single punch card form hole or no hole choice of signal connection or no signal connection.

Sequence plug-in modules, one for each sequence step, are individually mounted, readily replaceable and interchangeable, and each is provided with a single output and with a readily removable and interchangeable fluidic input circuit board. Output plug-in modules, each with a single output, are also individually mounted, readily replaceable, and interchangeable, and each of the output modules is provided with a readily removable and interchangeable fluidic output circuit board. A single manifold unit is provided between all the sequence modules and all the output modules. Readily removable and interchangeable punch card structure is provided between the sequence modules and the output modules. The manifold block device is used to connect each individual sequence module, one at a time, simultaneously to one or more of the selected output modules as determined by the punch card forms. If all card forms are punched for one sequence step, that sequence module provides a signal simultaneously to all of the output modules.

The next sequence step could connect the second sequencer module to only one or only a few of the output modules.

The sequence and output modules are provided on a plug-in basis to the manifold block so that for any application change it is only necessary to pull out or plug in whatever number of sequence and output modules are involved. Or simply to pull out one or more modules and change the fluidic circuit boards thereof by simply pulling one out and sliding another into spring pressed assembly in its particular module.

Each sequence module is provided with its own individual manifold passage in the manifold block and its own individual connection therefrom to each and every output module, punch card holes permitting.

These connections are separate, and no cross-talk or fluidic intercontamination is possible, either in the inputs to the punch cards or in the outputs therefrom.

In this invention, the 'signal to process' from each output module is a single signal. The output of each sequence module to the manifold is a single signal. But each sequence module may apply its output signal to as many of the output modules as desired, through a manifold passage individual to that sequence module, and from there to those of the output modules that are selected for signal connection to that manifold passage.

Thus, for any one such sequence module, there may be many simultaneous signals to the process. Sensors responsive to the situations thus commanded can, together as a whole, be related to each of the signals-to-process. Such response can be directed to affect the sequencer system where and as desired. Thus sequencer or other control action is accomplishable in response to output from sensor response to actual values, conditions, or situations of the process or energy being controlled or treated, including time based functions or combinations.

At least in part by all these structural features, singly or in various combinations, the feature of flexibility and adaptability of the sequencer system of this invention is established.

The variety of application of this invention thus lies in the basic plug-in structure of the sequence and output modules with the manifold block, in the removable and replaceable fluidic circuit boards in the sequence and output modules, in the replaceable punch-card forms which may or may not have a fluid connection hole for a particular module and the variety of process sensor response devices which may or may not be used or changed for a particular application. Such variety is abetted by the operationally fixed nature of the program matrix element.

The module structure of this invention may be considered as a building block system. Each sequence module is a block. Each output module is a block. The manifold unit is a block. With the manifold block as a base, any number of sequence blocks may be combined with any number of output blocks.

For each sequence station of this invention, that sequence block may be connected with any number or combination of the available output blocks. Each different sequence station block ordinarily will be connected to a different combination of the same group of output blocks, in different program patterns as determined by holes present or not present in punch card forms or areas individual to each of the sequence stations.

Among the further features of this invention, in combination with the fixed program matrix, is the comparison, or 'coincidence' check device, which determines whether the process actually achieves the results called for by the 'command' signals. If there is coincidence, a signal may then be sent, for example, to enable the advance of the sequencer system to the next sequence station. It is notable that usually, for any one sequence station, such coincidence is simultaneously required of at least several process situation sensor responses.

In the further feature of this invention the 'repeat module' in the nature of a 'DO LOOP', is a device with suitable sensor connection from the process, usually in addition to the 'coincidence' sensors, which will cause a particular sequence station or group of stations, to repeat if a particular requirement, or group of requirements in the process, is not met.

Other such protective devices with a sequence system of this invention include various inhibit controls, and set, reset, or override controls at points of particular concern, either manually actuated, or responsive to pertinent condition signals.

As an illustrative application of this invention, a 22-station sequence controller may be used to operate an automatic production grinding machine. Amplifiers in the outputs of the output modules can provide output pressure levels of the order of 50–100 p.s.i., adequate to operate most pneumatic and hydraulic components on tool machines.

Programming, in this invention, is accomplished by means of program matrix structure, such as readily removable punch card forms.

Sequencing of the system of this invention is accomplished by a form of scanning of the punch card forms in the sense that each new sequence step uses a different line area of the punch card forms and that the steps of such scanning are the sequencer steps from station to station. Such steps are accomplished with fluidics, without moving parts, and in response to signals emanating from sensors of process or energy situations subject to the control of the system of this invention.

The sequence modules are operative one at a time in the sequencing action, and when any sequence module is operative, it is connected, selectively through the punch cards, to the selected ones of the output modules. Thus, at any one time, all output modules can be activated exclusively through any single one of the sequence modules unless prevented by an absence of a particular punch card hole. The manifold block unit is provided with separate manifold passages, each individual and exclusive to a different one of the sequence modules.

The punch card program matrix structure is scanned, from sequence station to sequence station, in the sense of operative steps from one line of potential openings to another such line.

The scanning of the punch card inputs is in the sense of moving from one sequence step to the next; that is, from one sequence module and its pattern of output modules to the next sequence module and its pattern of output modules. This scanning is accomplished with fluidic modules and systems on the basis of signals from sensors of the process or energy being controlled.

Each sequence station modular system may be considered in the form of a garden rake. The sequence module is the handle, the cross-bar is the manifold passage individual to that sequence module, and the tines are the output modules. Each sequence station has a different rake handle and cross-bar combination. But all output modules are available as the same tines for different cross-bars. Which tines are operatively connected to which cross-bar is a function of the punch card holes.

The various peripheral systems and devices are provided as safety or extra control means. The coincidence system insures that the command of the sequence system in fact results in the process or energy situation that was intended. Further, the inhibit devices are provided to prevent operation under other undesirable conditions such as excessive or insufficient temperature, absence of cooling fluid, absence of work piece, improper combination of chemical substances, and other such situations, depending upon the application.

The further peripheral systems include sequence step repeater fluidic control, a start-up fluidic system, and various set and reset fluidic systems applicable to some or all of the fluidic circuits and systems of the device.

While the sequencer according to this invention is applicable to any process or energy situation or combination, an illustrative application is a sequencer system for the operation of a machine tool. For example, one sequence step might control simultaneously the location, width, depth, and length of a metal tool cut, the flow and/or timing of lubricant or coolant, rotational speed of an arbor, and many others. When all called for conditions are met and finished at one sequence station, the system automatically steps the sequencer to the next sequence station, with its own set of commands to a new set of conditions.

The sequence step(s) may be repeated if a particular command is not carried out; for example, if a metal cut depth is insufficient.

Advantages and features of this invention in addition to those set forth hereinbefore will be apparent hereinafter and in the accompanying drawings, wherein.

Figure 1:
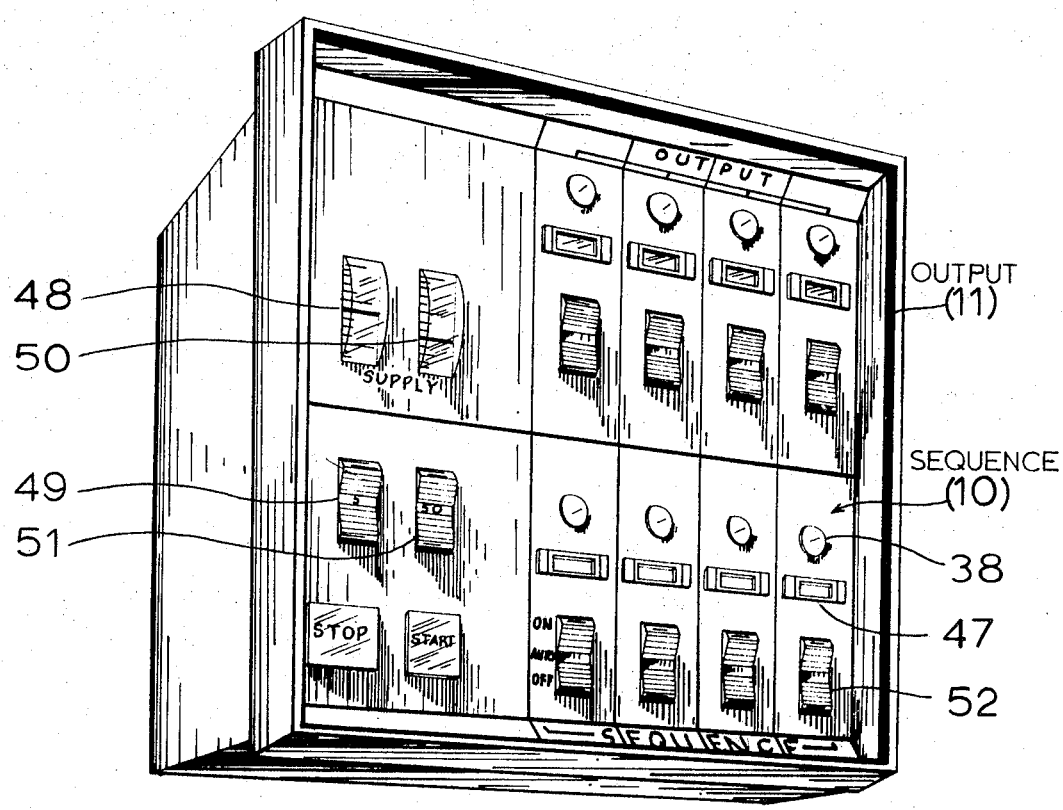
FIG. 1 is a perspective of a small assembly of a modular sequencer system according to this invention.
Figure 2:
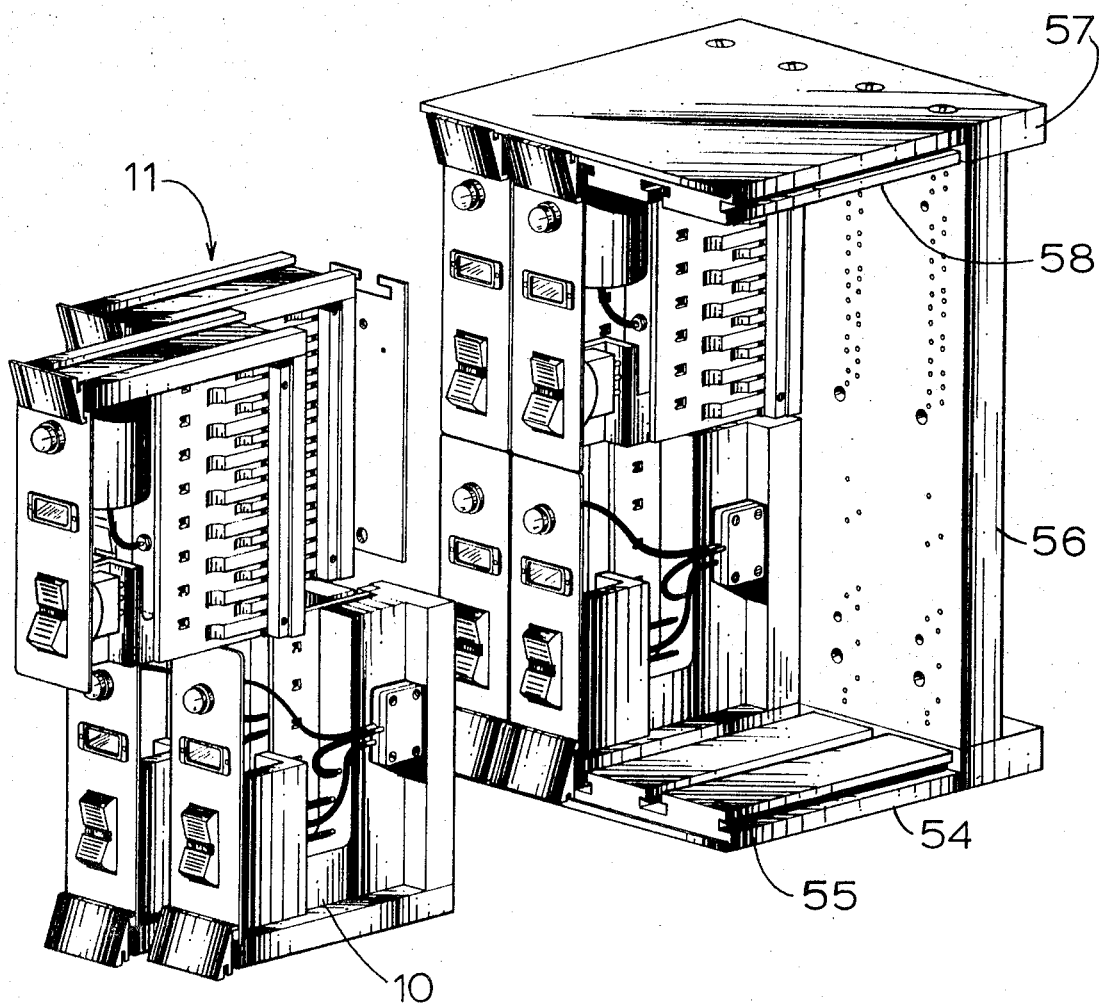
FIG. 2 is an exploded view of structure according to FIG. 1.
Figure 2A:
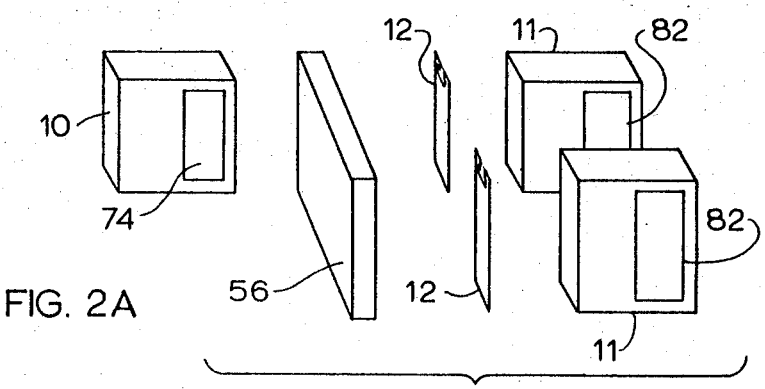
Figure 2B:
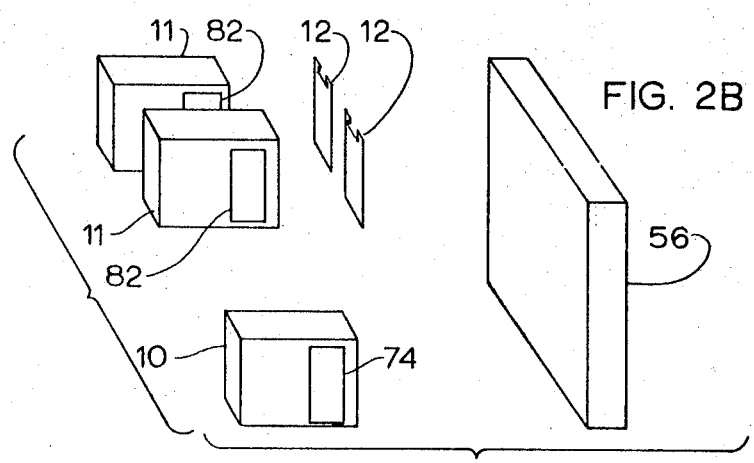
Figure 2C:
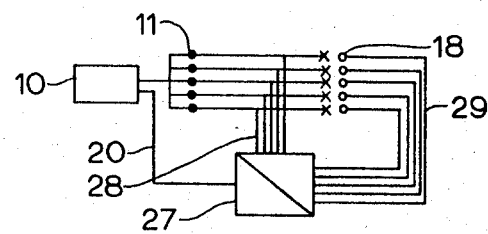
Figure 5:
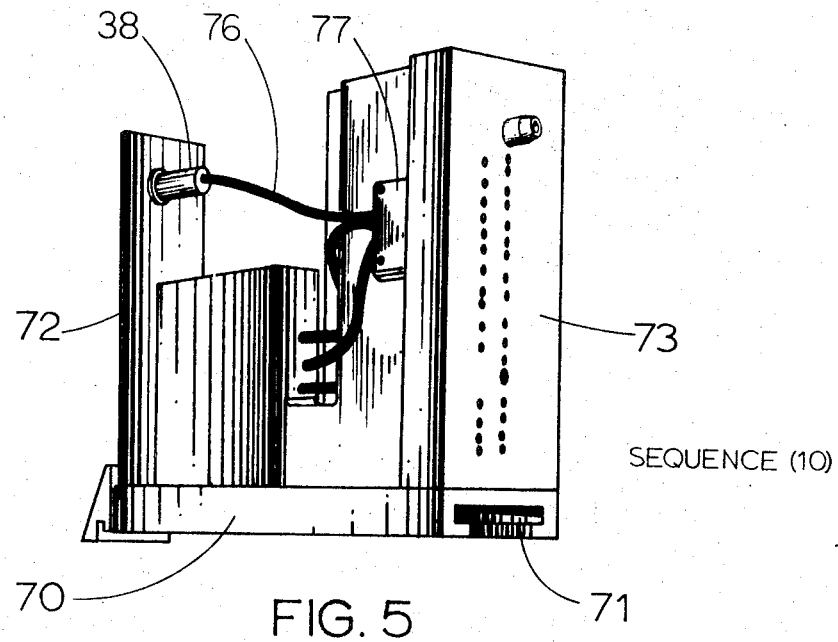
Figure 6:
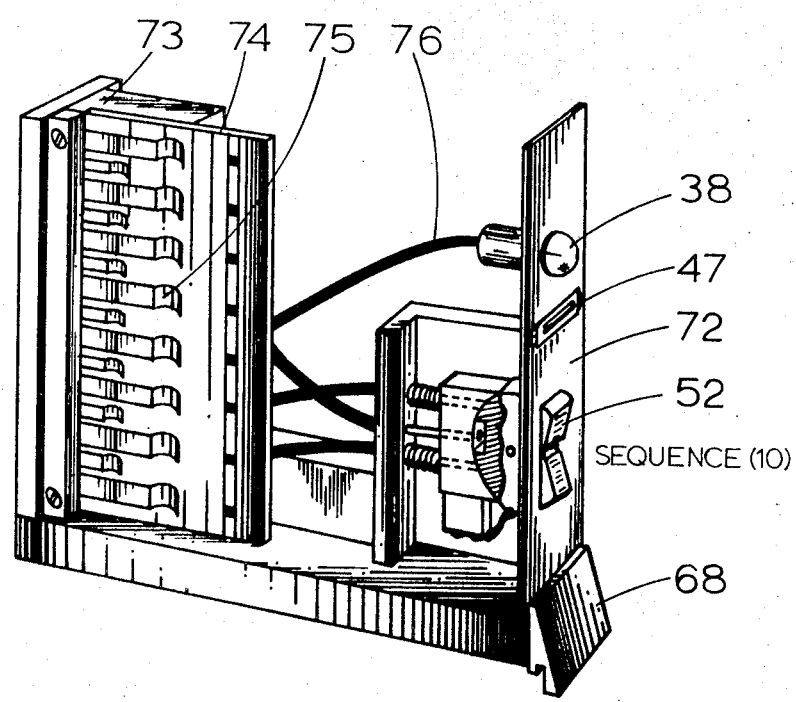
Figure 7:
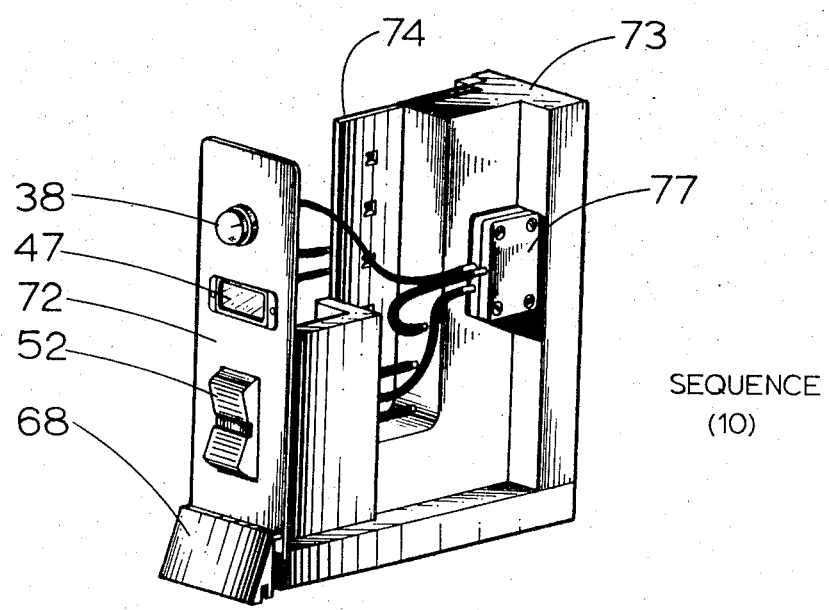
Figure 8:
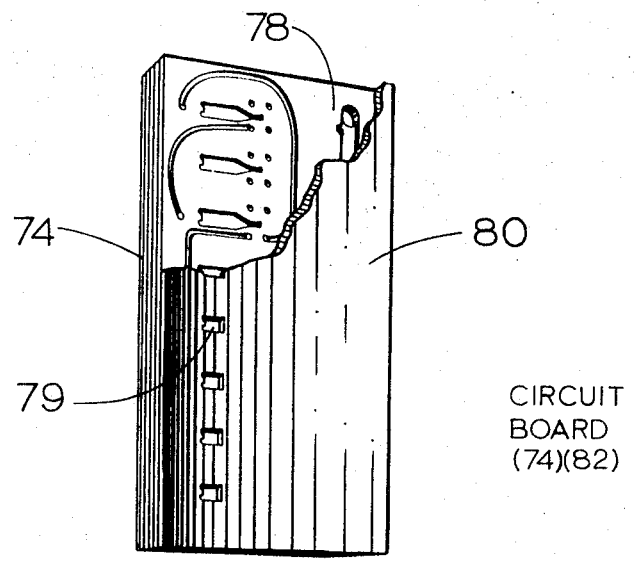
Figure 9:
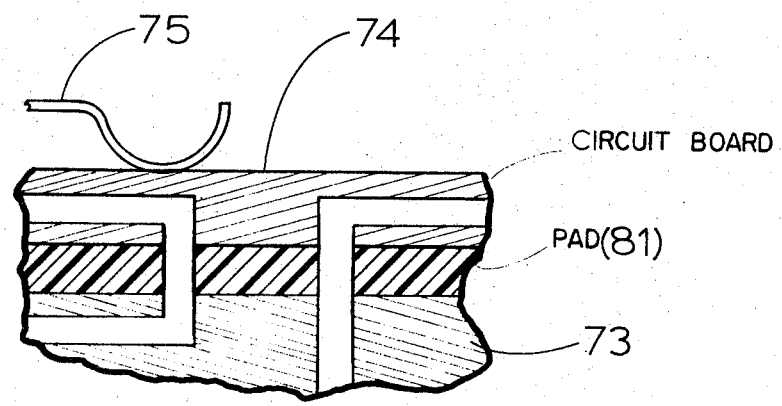
Figure 10:
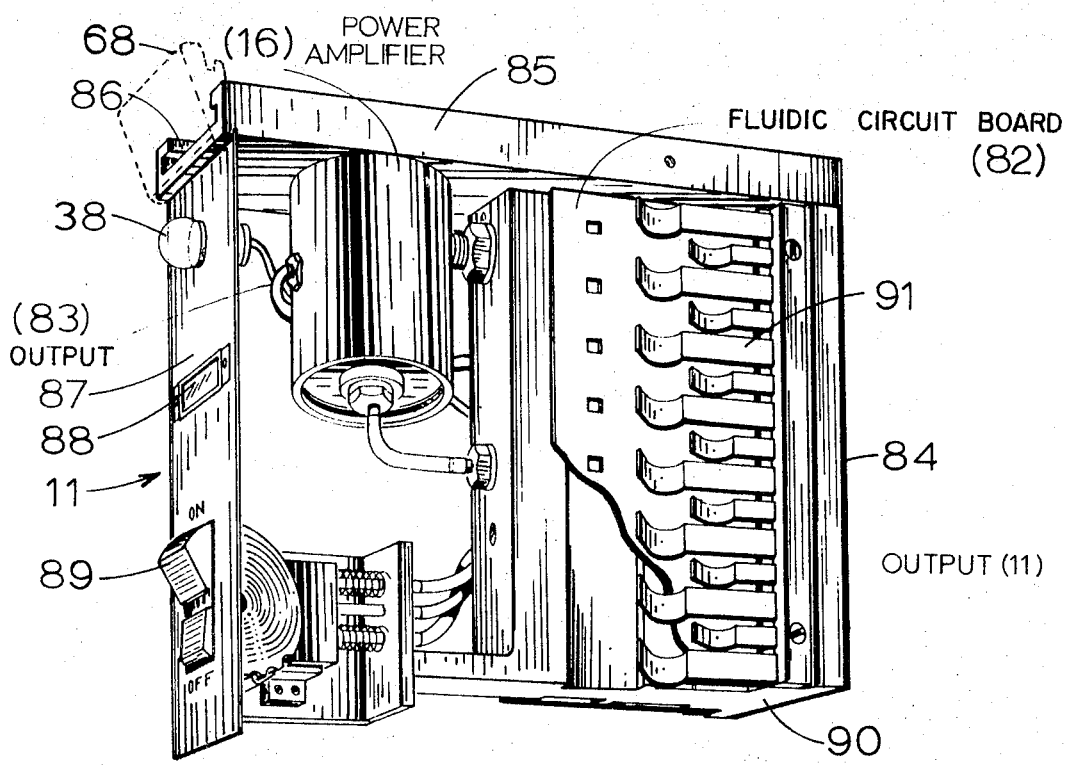
Figure 11:
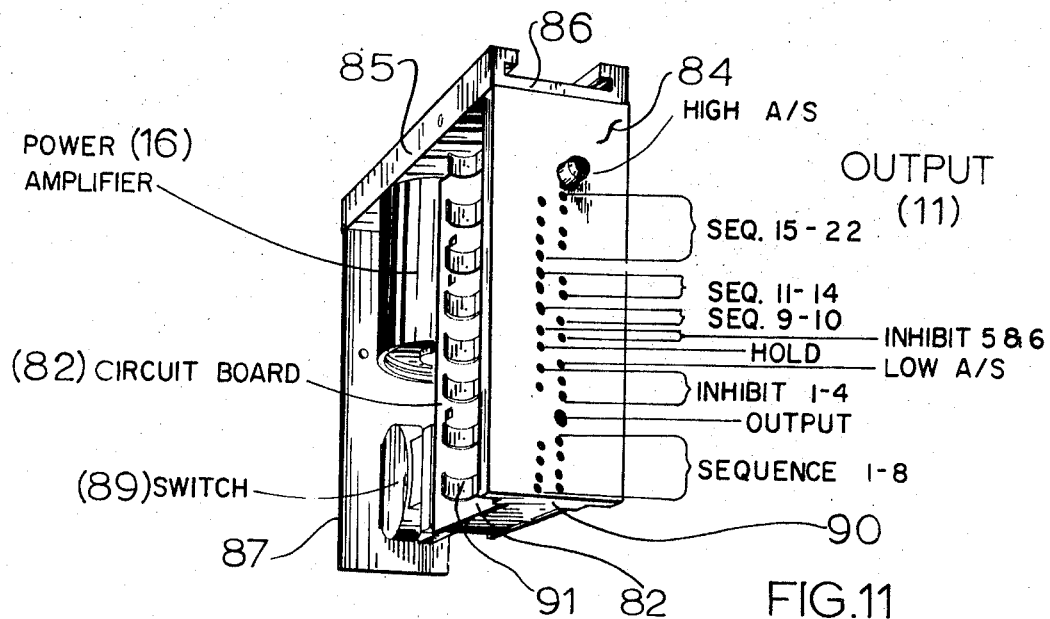
Figure 12:
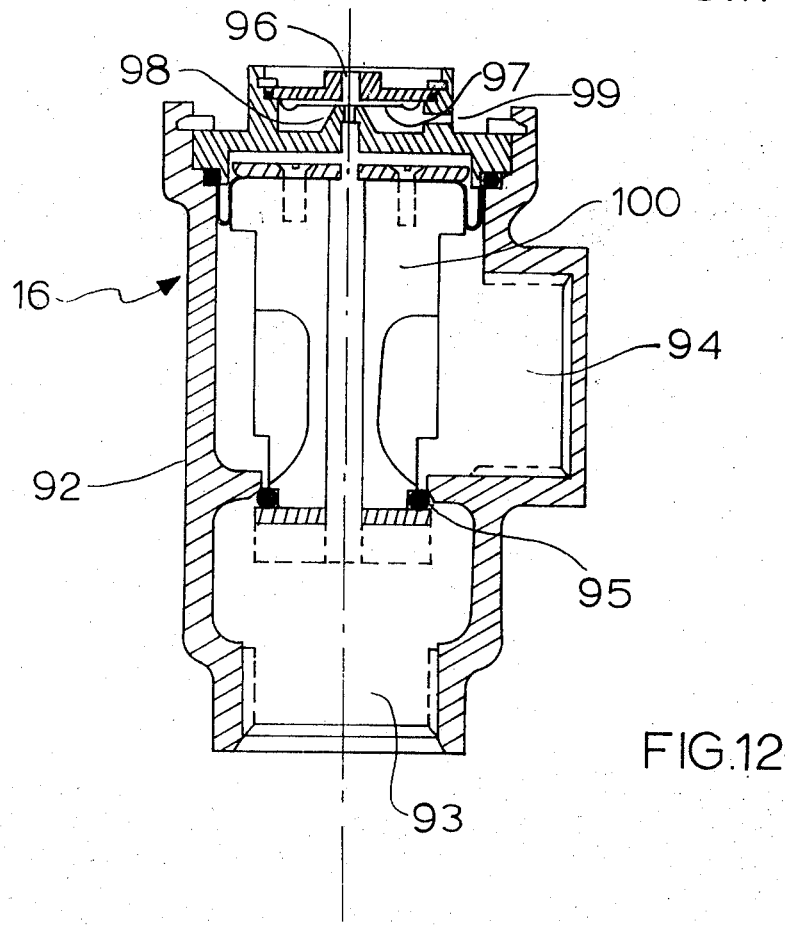
Figure 13:
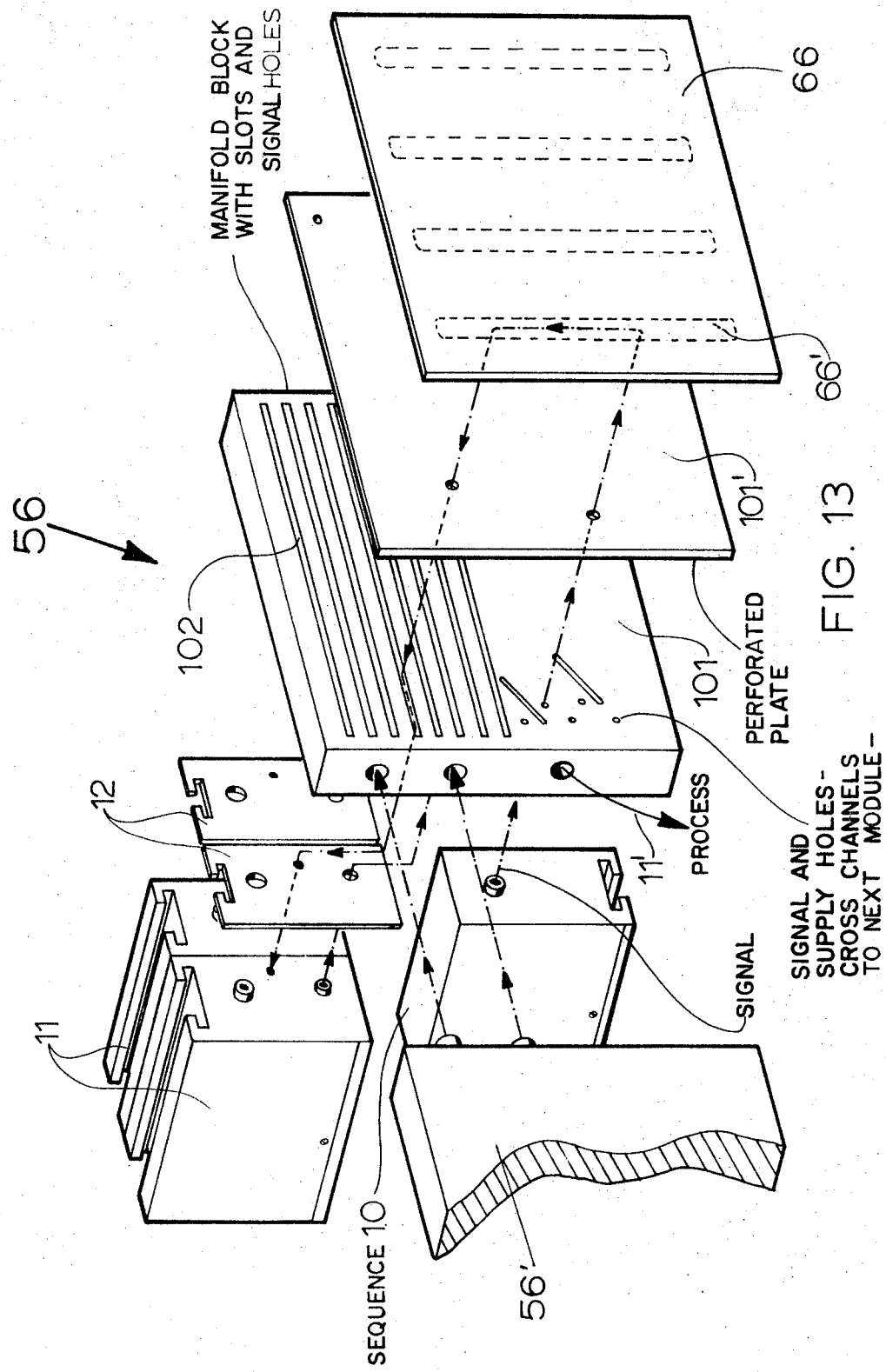
Figure 13A:
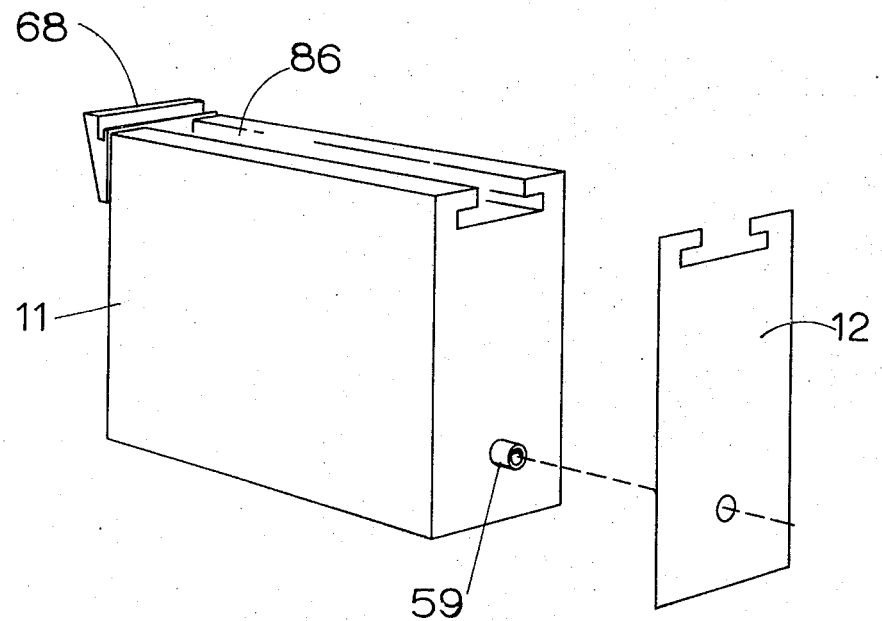
Figure 13B:
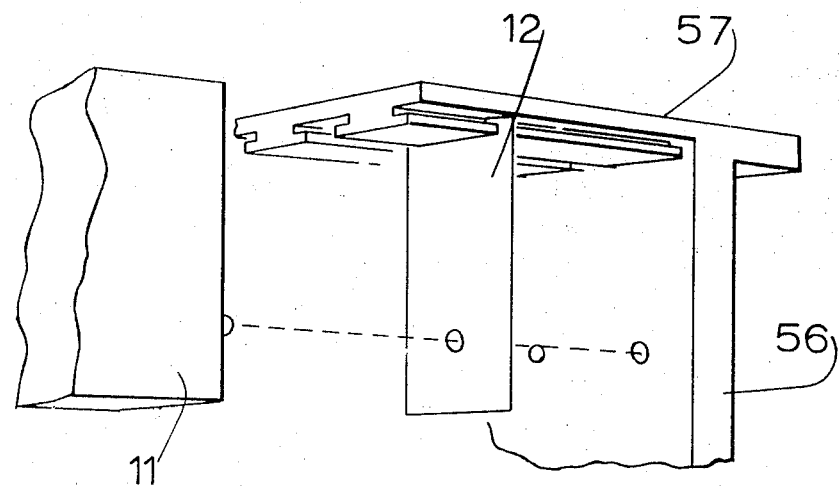
Figures 14, 15:
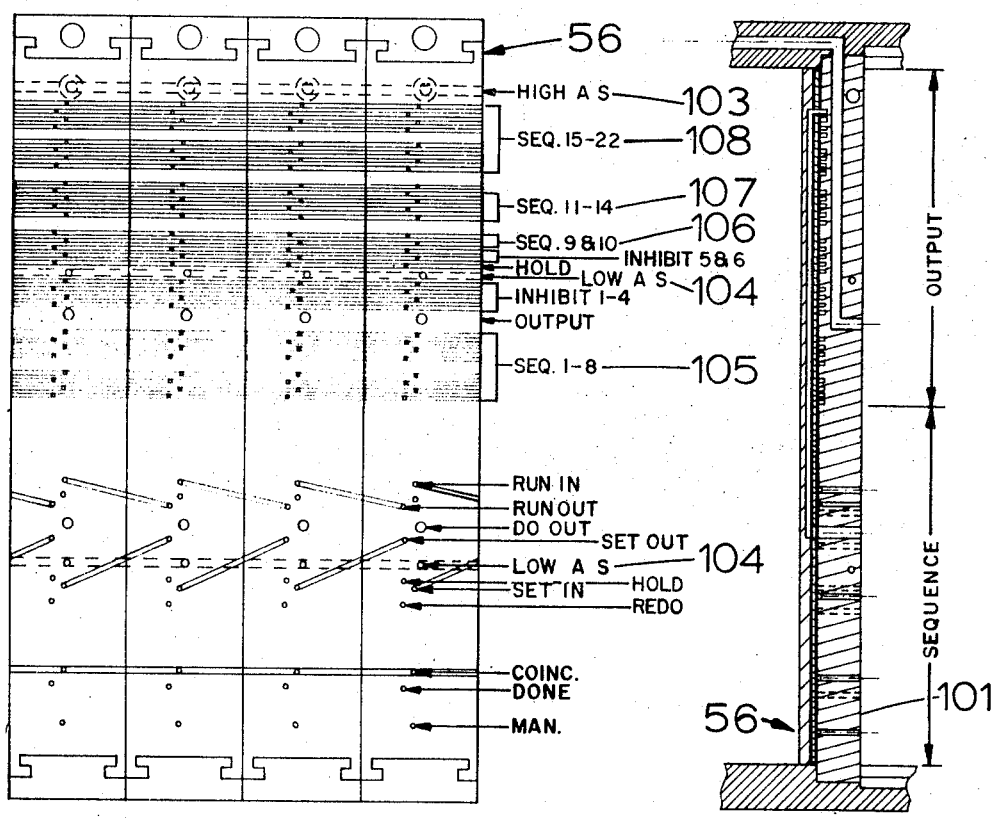
Figure 16:
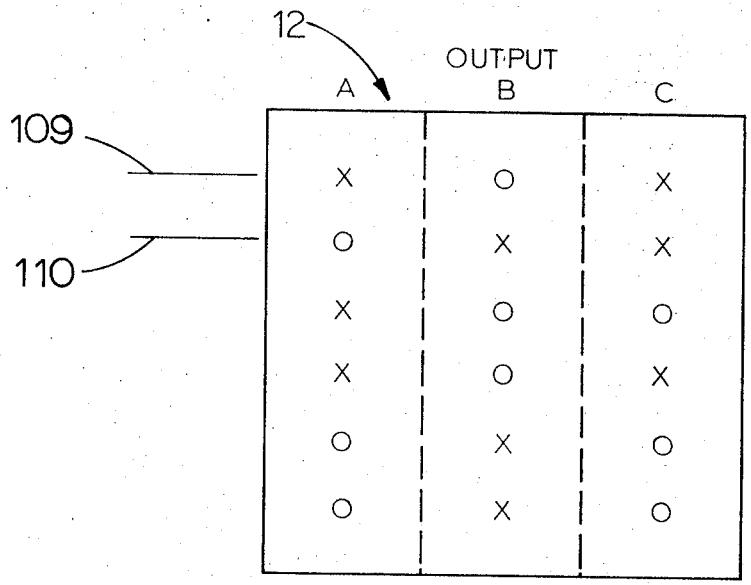
Figure 17:
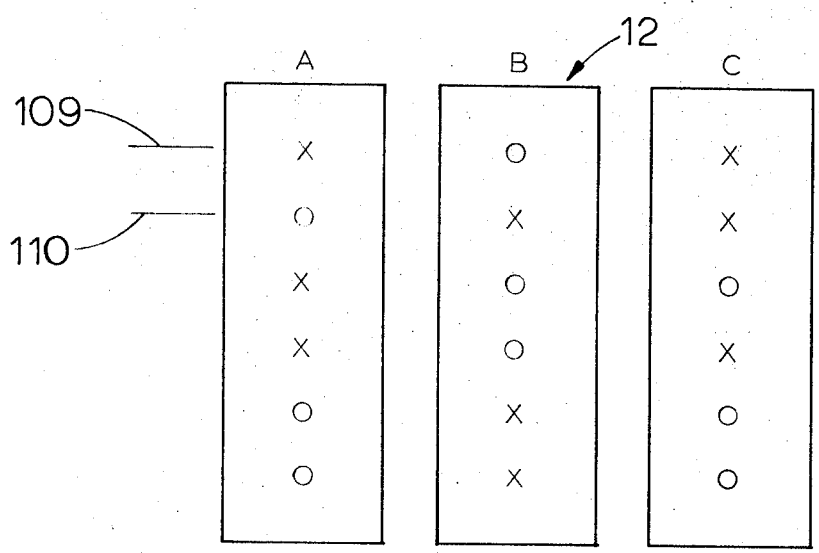
Figure 18:
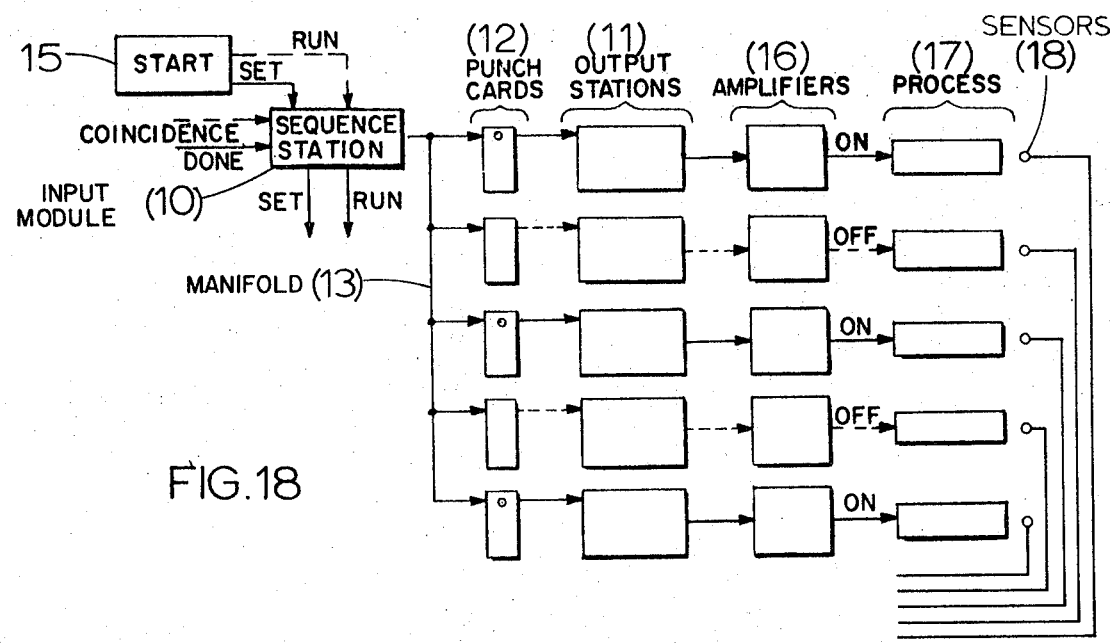
Figure 19:
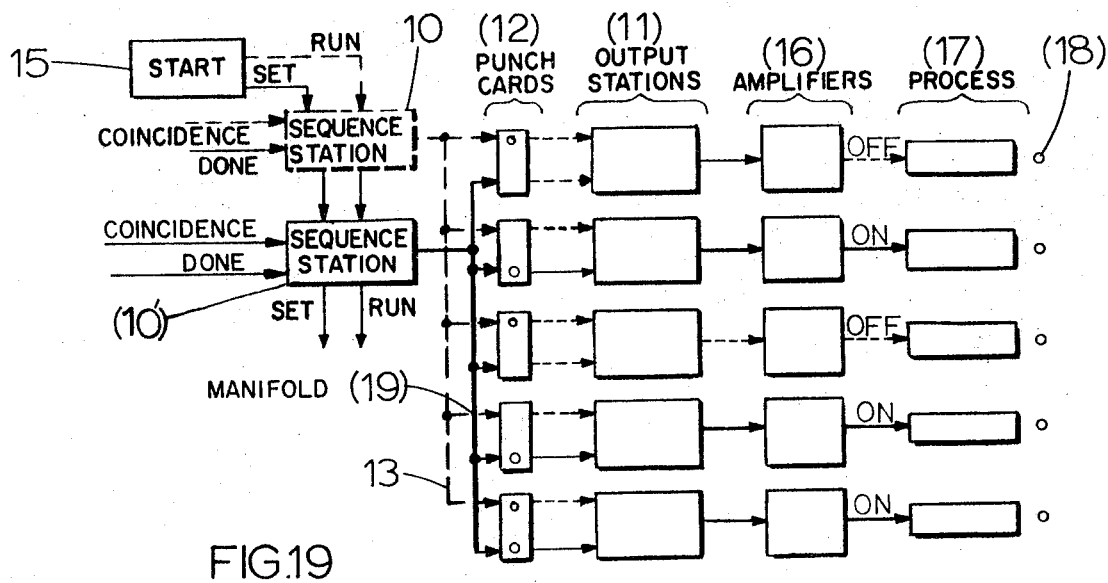
Figure 20:
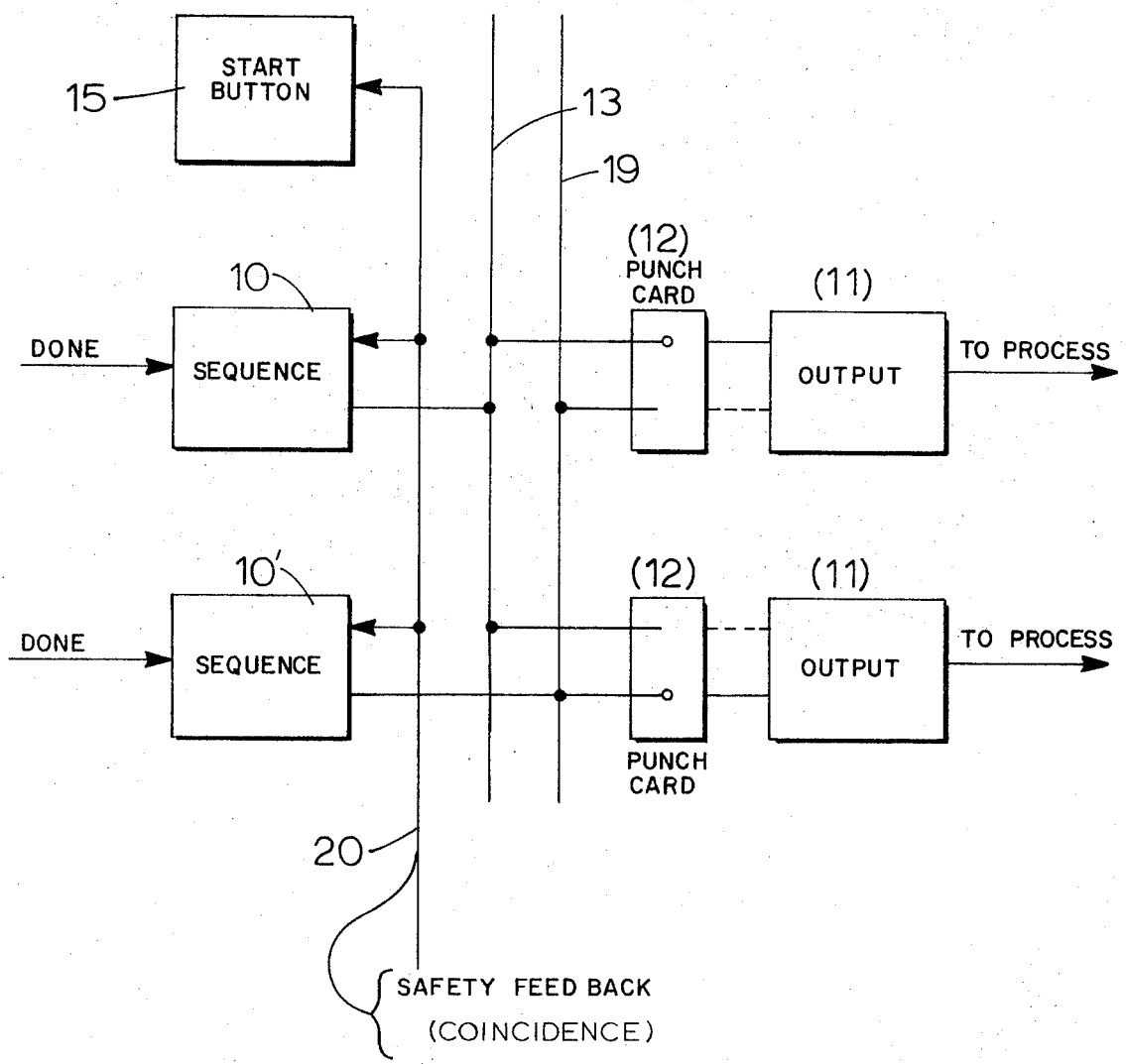
Figure 20A:
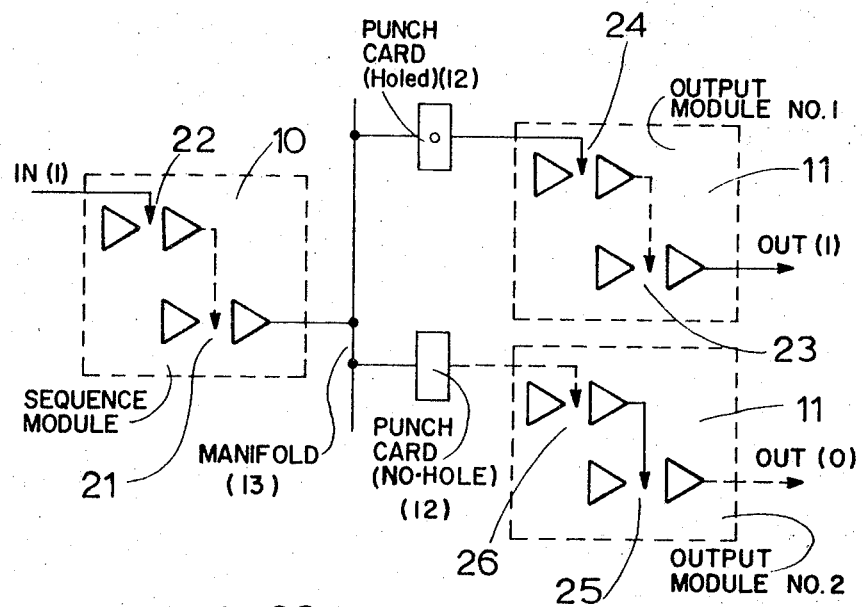
Figure 20B:
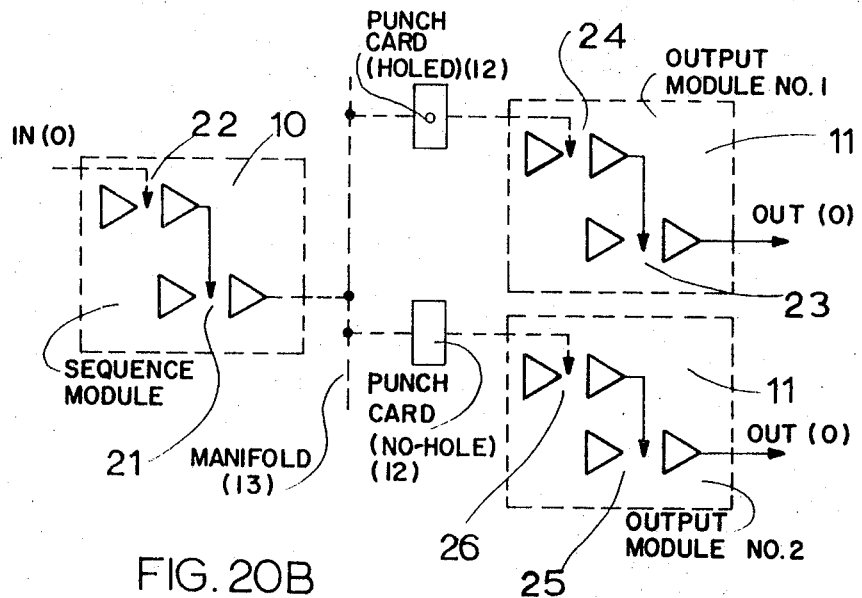
Figure 21:
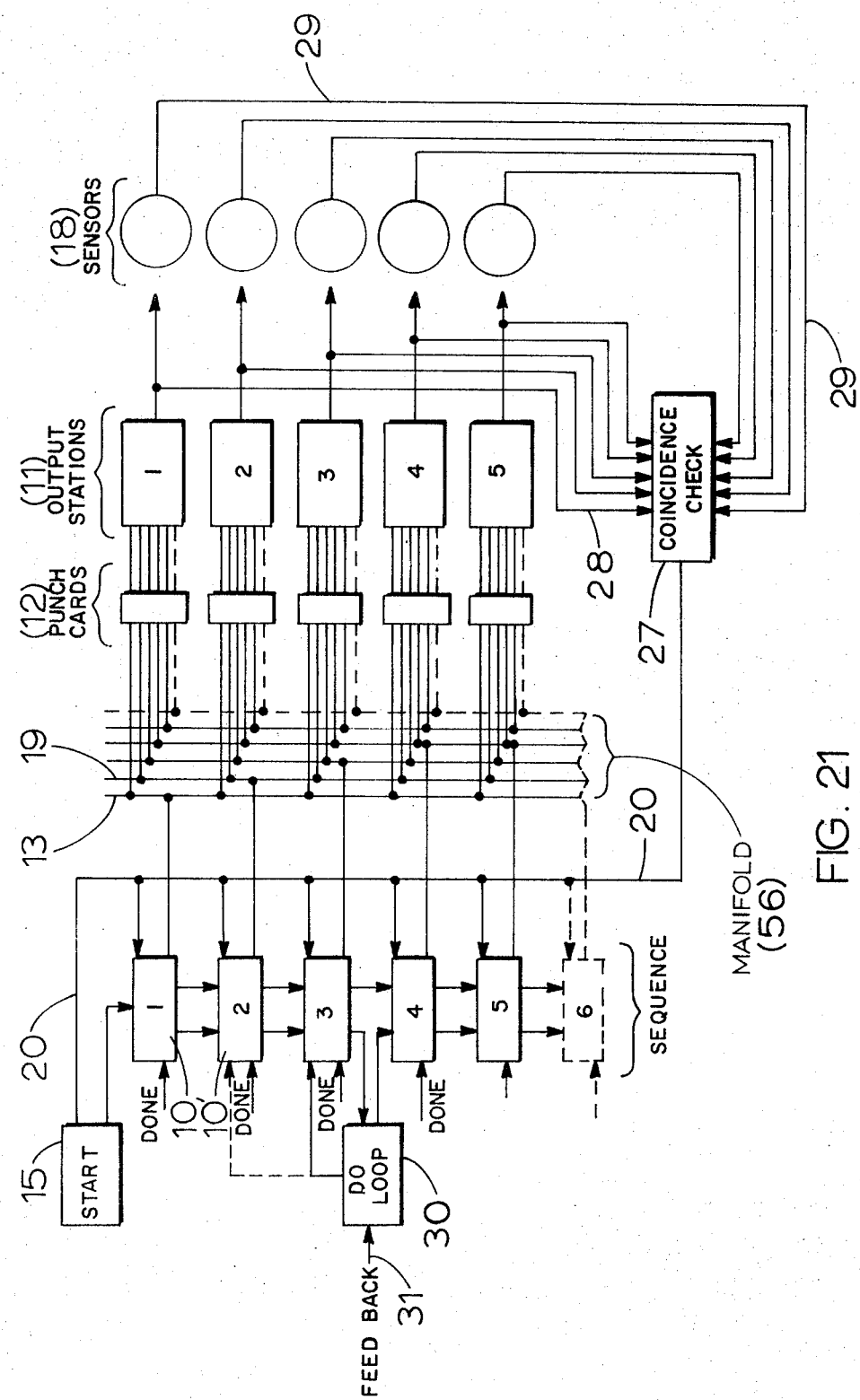
Figure 22:
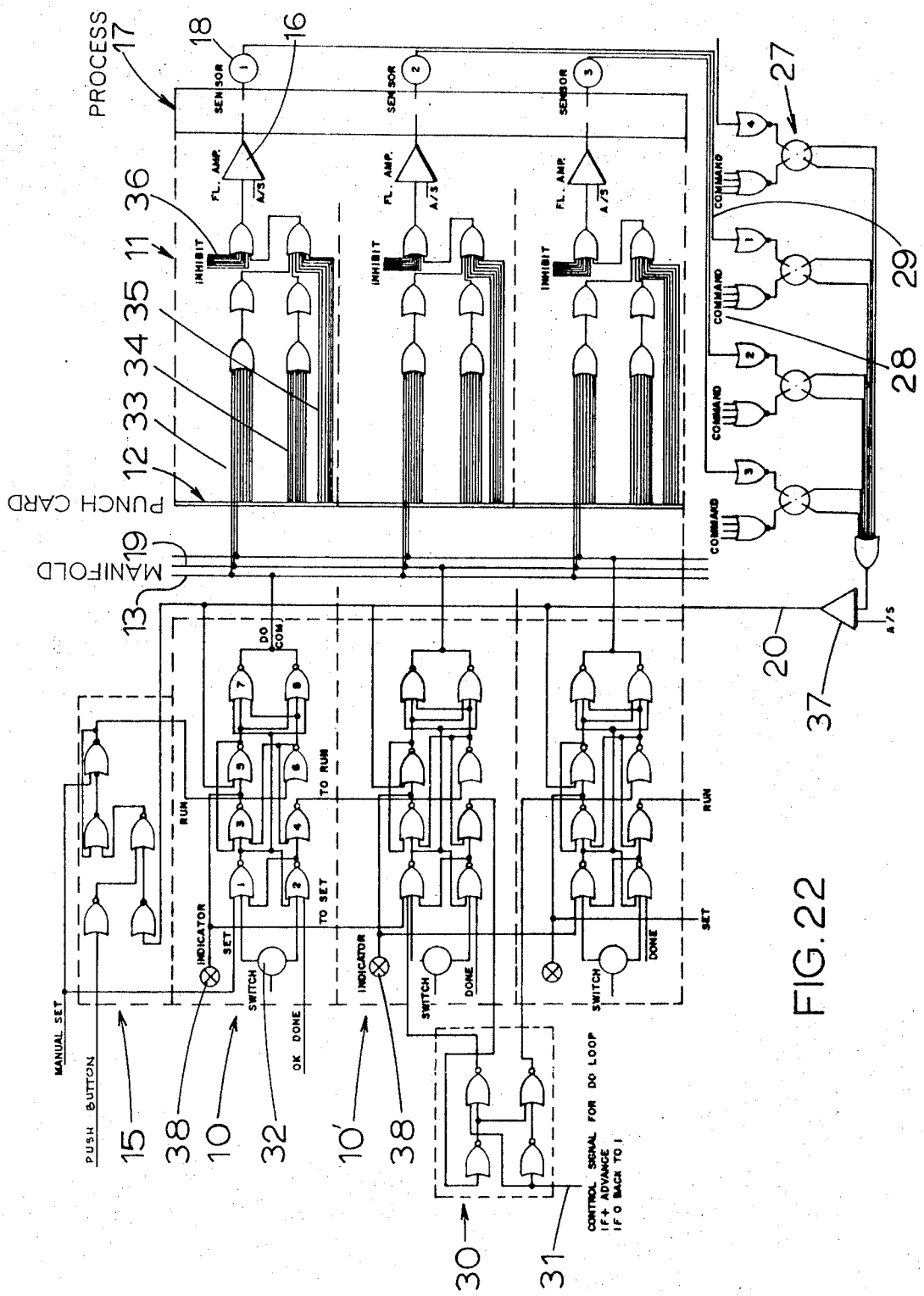
Figure 23:
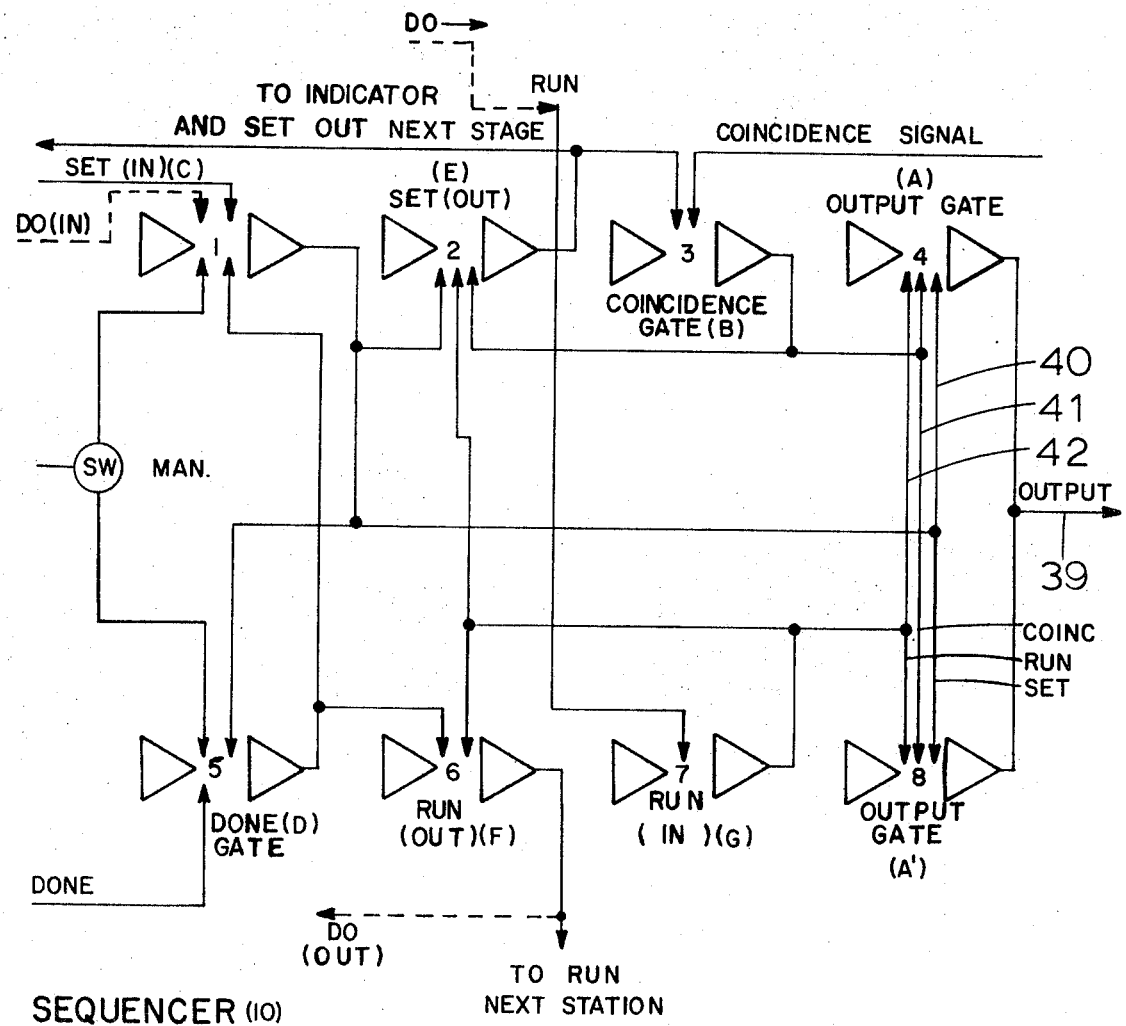
Figure 24:
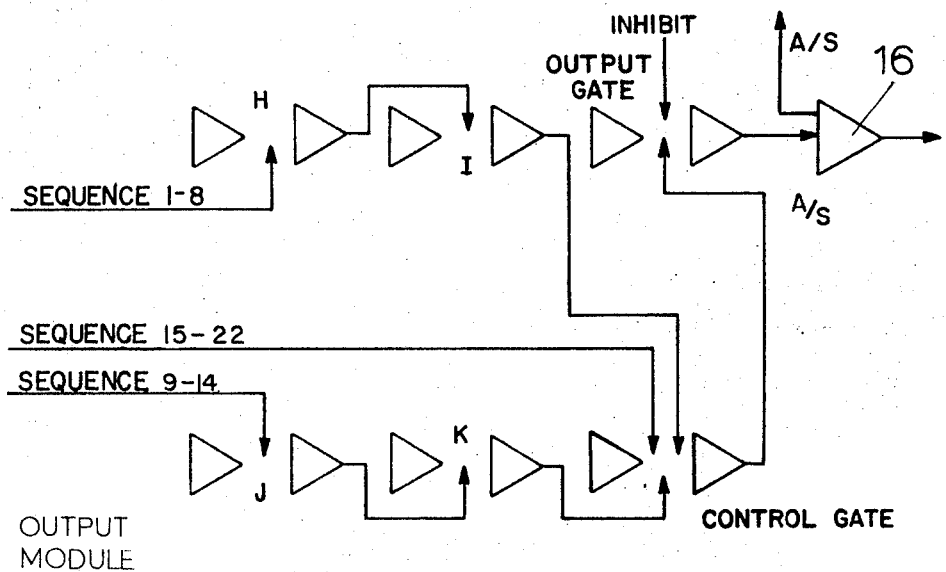
Figure 25:
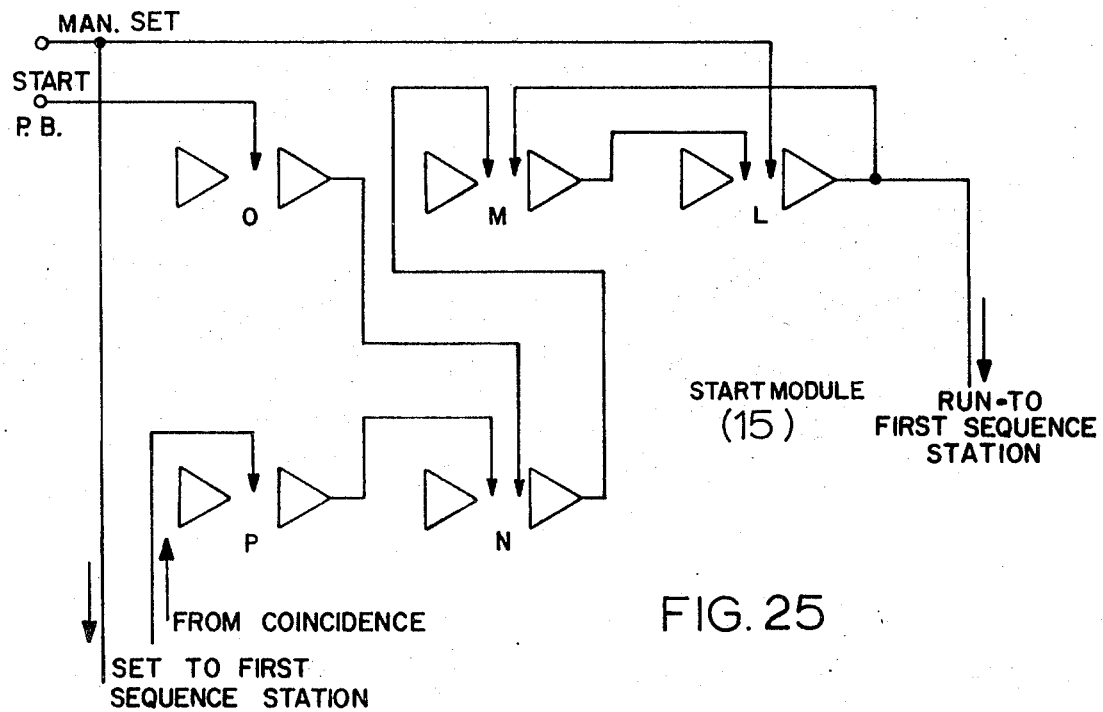
Figure 26:
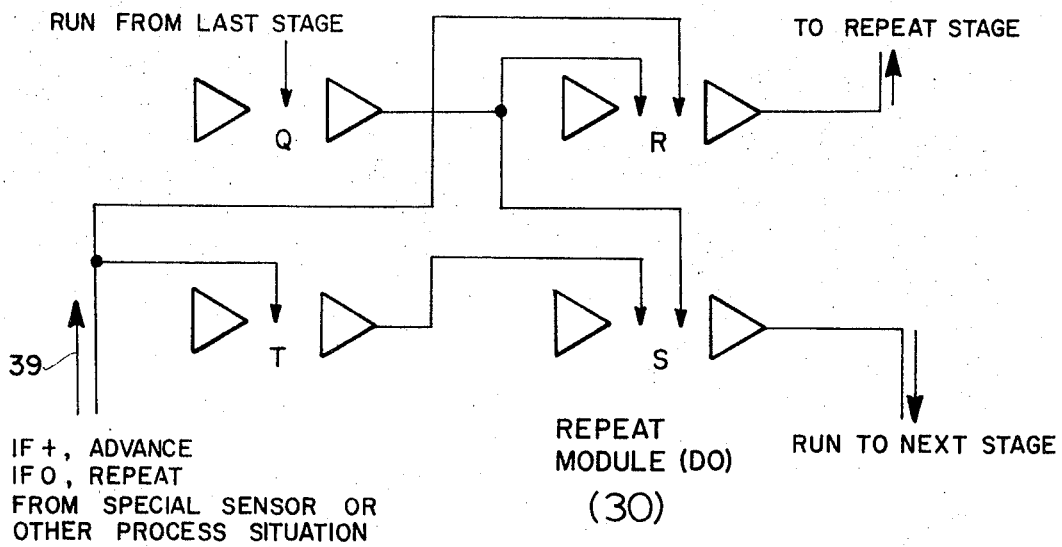
Figure 27:
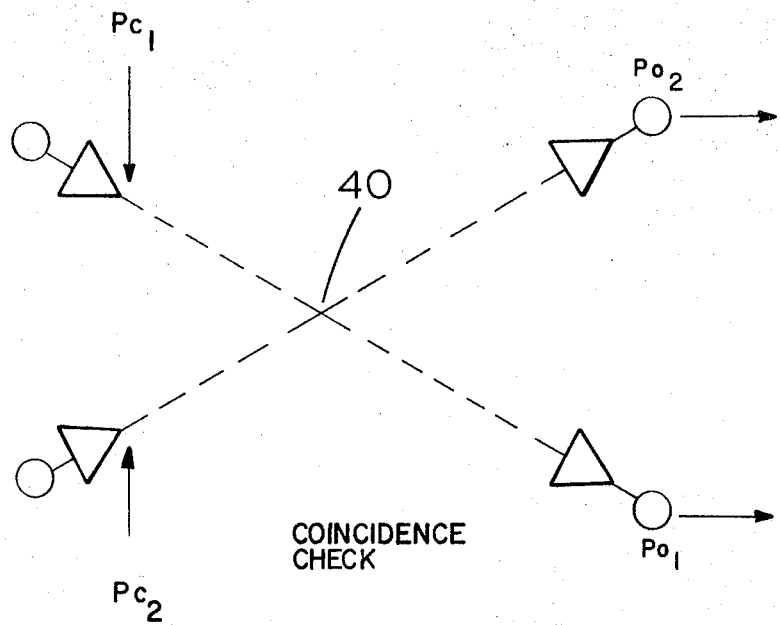
Figure 28:
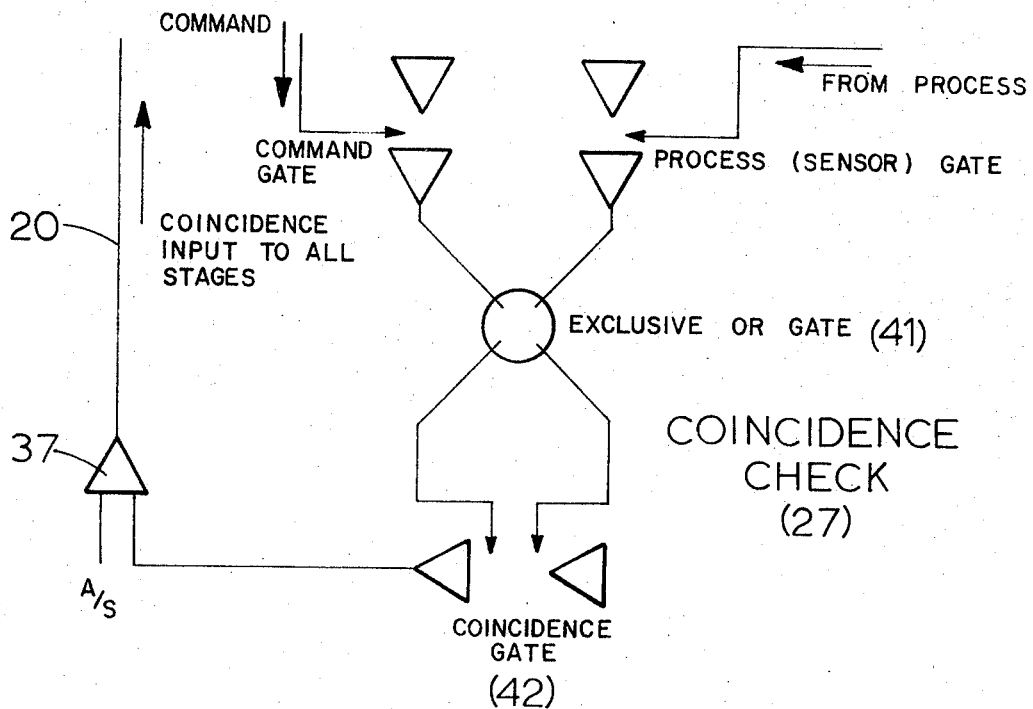
Figure 29:
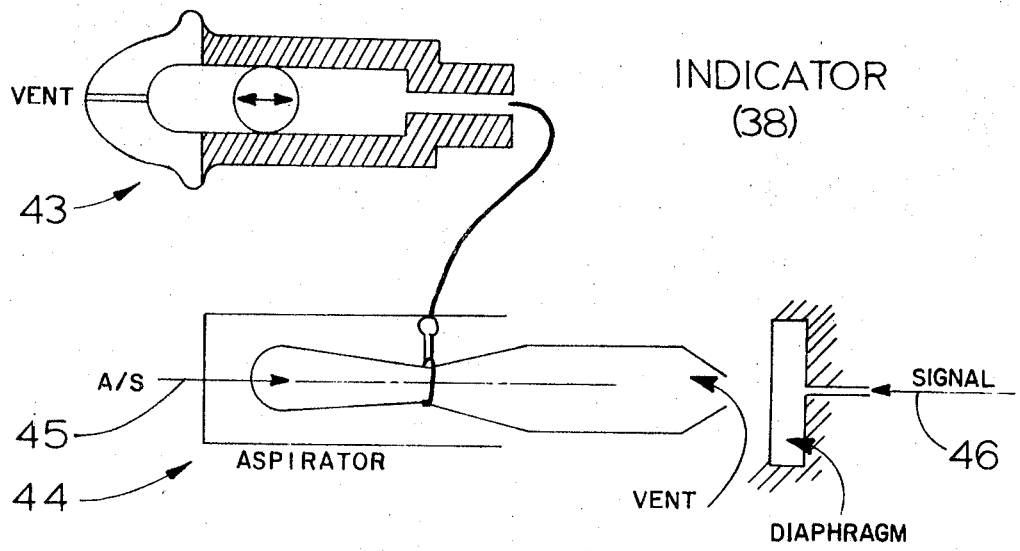
Figure 30:
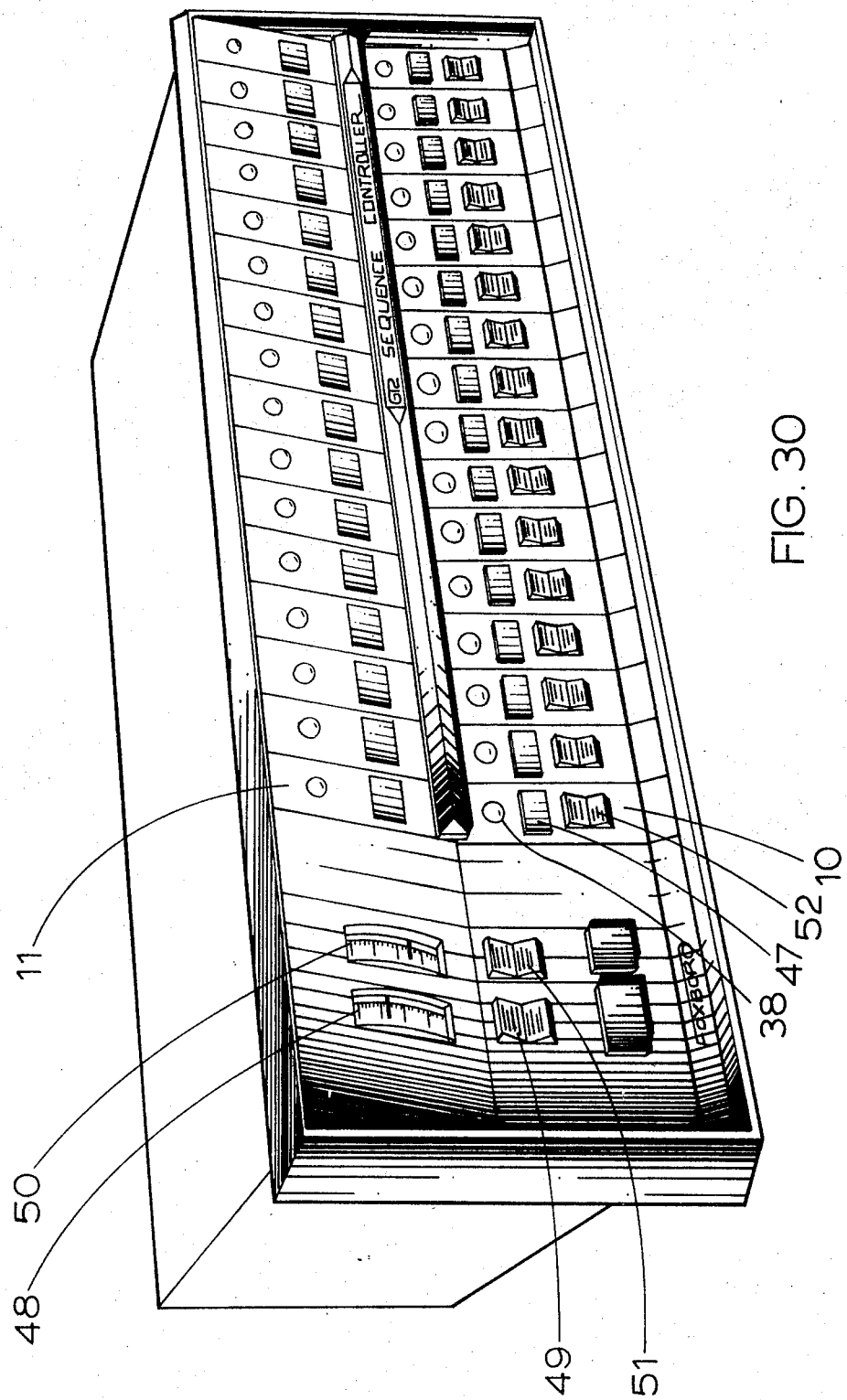

FIG. 2A, 2B, and 2C schematically illustrate the application flexibility of this invention;

FIG. 3 is a view of a means of operative assembly of an output module to the manifold;

FIGS. 4, 4A, and 4B are details of the mounting of the modules on a support base;

FIG. 5 is a rear perspective of a sequencer module according to this invention;

FIG. 6 is a front perspective of the sequencer module of FIG. 5;

FIG. 7 is a side perspective of the sequencer of FIG. 6, of the side opposite to that shown in FIG. 6;

FIG. 8 illustrates a fluidics circuit board of the nature and type which may be used in either a sequence module or an output module according to this invention. No specific fluidic system is illustrated;

FIG. 9 is a fragmentary sectional showing of a circuit board assembly according to FIG. 8;

FIG. 10 is a front perspective of an output module according to this invention;

FIG. 11 is a rear perspective of the output module of FIG. 10;

FIG. 12 is a sectioned detail of the power amplifier of FIGS. 10 and 11;

FIGS. 13, 13A, and 13B are exploded details of a manifold and punch card combination according to this invention;

FIG. 14 is a view of the operating face of a manifold body according to this invention;

FIG. 15 is a vertical, edge view section of a manifold block including the body of FIG. 14;

FIGS. 16 and 17 illustrate punch card forms for use in this invention, FIG. 16 as a single card for covering several modules, and FIG. 17 as separate cards individual to each module;

FIG. 18 is a system schematic showing the first sequence module (station 1) with a group of output modules;

FIG. 19, in the sense of FIG. 18, illustrates the system of a second sequence module (station 2);

FIGS. 20, 20A, and 20B are simplified system schematics, illustrating potential connections between sequence and output modules of this invention;

FIG. 20C is a block schematic of a single sequence station system according to this invention;

FIG. 21 is a block schematic of a sequence system according to this invention;

FIG. 22 is a detail schematic of the block system of FIG. 21;

FIG. 23 is a schematic of a sequencer module fluidic system according to this invention, using turbulence amplifiers, and as in FIG. 22 and FIG. 23 A is FIG. 23 in unit symbols;

FIG. 24 is a schematic of an output module fluidic system according to this invention, using turbulence amplifiers, and taken from FIG. 22;

FIG. 25 is a schematic of a start module fluidic system according to this invention, using turbulence amplifiers, and taken from FIG. 22;

FIG. 26 is a schematic of a DO loop, repeat module fluidic system according to this invention, using turbulence amplifiers, and taken from FIG. 22;

FIGS. 27 and 28 are schematics in different detail, of the exclusive 'OR' fluidic coincidence gate, using turbulence amplifiers, and taken from FIG. 22;

FIG. 29 is a schematic of a fluidic system indicator light as represented in FIG. 22; and FIG. 30 is an illustration of a large assembly of modules, as an expansion of the FIG. 1 system, to the extent of many more sequence stations and associated output modules.

THE DRAWINGS — SCOPE

The drawing figures fall mainly into two categories. FIGS. 1 through 17, and 30 are devoted for the most part to structure, that is, illustrative forms of actual structure in accordance with this invention. FIGS. 18 through 29 are devoted to fluidic circuitry in overall system and modular system form, illustrative of fluidics applicable to the hardware of the other figures, and illustrative of features and principles of this invention.

In the following, the circuitry, FIGS. 18 through 29, is presented first.

FLUIDIC CIRCUITS-CONCEPTUAL AND SUB-SYSTEMS

FIGS. 18 through 20C are simplistic circuit showings in preparatory explanation for the presentation of the overall system of FIGS. 21 and 22, and FIGS. 23 through 29 illustrate modular and subsystems.

These Figures, 18 through 20C represent portions of the overall fluidic circuit system set forth in FIGS. 21 and 22. These showings of single sequence stations and their operational fluid connections, actual and potential, one station alone, and one station in relation to another station, are presented as simplified explanation of embodiments of this invention, and as lead-in explanations to the systems of FIGS. 21 and 22 wherein developments and combinations of the showings of FIGS. 18 through 20C are combined in an overall system.

The drawing FIGS. 18 through 29 further delineate the highly flexible nature of this invention in terms of the ready variability of its application to different process or energy control systems. FIGS. 21 and 22 set forth a closed loop control system wherein actual process or energy conditions are used as a basis of actuation or operational change in the sequence and output systems of this closed loop.

FIGS. 18 and 19 illustrate that many output modules are simultaneously subject to operation from and by a single sequence station at any one point in time, and that, FIG. 19, different sequence stations operatively relate to the same output stations, at different times and in different combinations.

In FIG. 18, a single sequence module 10 is shown in relation to all of a set of output modules 11, connected to some and not to others, according to punch holes or lack of punch holes in a set of punch cards 12, with a single different punch card for each output module, and through a manifold passage 13.

The FIG. 18 showing is an illustration of the sequence system condition at any one point in time. That is, at any step in the sequence, one sequence module is established in combination with a (punch card) programmed group of output modules. As in FIG. 19, the next sequence step, a different sequence module, uses a different combination of the same output modules 11, and the first sequence module is inoperative at this point.

A start module 15 is provided to initiate the system operation, and individual fluid amplifiers 16 are provided in the output of each of the output modules 11, with output therefrom to process 17. The different blocks of process 17 represent different parts or situations of the same or associated process(es) or energy under control by the sequencer. Process sensors 18 are provided for the process blocks 17, for feedback, as partially shown, to control scanning, sequence, and other functions of the system as set forth hereinafter.

Each sequence module has a single process output signal which is directed to its particular manifold passage (13, 19, etc.), and each output module 11 has a single process output signal, directed through its amplifier 16 to its individual process situation 17.

Scanning, in the sense of the system, is proceeding from one horizontal line of punch card openings (see FIGS. 16 and 17) to the next such line of openings. The individual cards of FIGS. 18, 19, and 17 are equatable to the single punch card of FIG. 16. Consequently, scanning is accomplished as the system is stepped from one sequence station to the next. In this system, this is accomplished by fluidics; for example, with turbulence amplifiers, and without moving parts.

Each of the sequence modules of FIGS. 18 and 19 are provided with inputs such as coincidence, done, set, and run: these safety and operational elements are discussed further hereinafter.

FIG. 20 broadly illustrates the application of feedback to the sequence and other modules in a block showing of a partial system like FIGS. 18 and 19, with the manifolds 13 and 19 selectively connecting the sequence modules to outputs 11, according to holes in the punch cards 12. FIG. 20 thus particularly illustrates a safety feedback 20, applicable to all sequence modules and the start module. This feedback is from a coincidence check system, set forth hereinafter, as a means of comparing output command signals with actual process condition feedback signals. Unless the process or energy condition is what it should be, the feedback 20 will not deliver operative release signals to the various modules.

FIGS. 20A and 20B illustrate the use of fluidic turbulence amplifiers as gates in the modules of this device. Broadly, in each case, an operational gate is controlled by a signal from an inhibit gate. This is shown in a system of one sequence module 10, one manifold passage 13, and punch cards 12 holed the same in both figures, using turbulence fluidic amplifiers in a simplified showing of possible combinations in the sequence and output modules of the system of this invention. In FIG. 20A there is shown an input (run) signal to the sequence module 10. In FIG. 20B there is no run signal to input module 10.

Such turbulence amplifiers provide laminar fluid flow across an open space, diffusable by a transverse control signal to provide 'zero' output when diffused, a 'one' output when not diffused (no control signal). In the sense of this invention, these turbulence amplifiers are used as fluidic gates.

The simplified sequence module 10 of FIG. 20A comprises an operational turbulence amplifier gate 21 and a control gate 22 therefor. The output of gate 21 is to manifold passage 13, which leads to punch cards 12. Beyond the punch cards are the output modules 11, one having an operator gate 23 and a control gate 24, the other having an operator gate 25 and a control gate 26.

In FIG. 20A the input signal (1) to gate 22 cuts off the control signal to gate 21, releasing the output signal of gate 21 to the manifold 13. This signal proceeds through the holed punch card to cut off the control signal of gate 24, in turn to release the output of gate 23 to provide an output 'one' in response to the input 'one' to gate 22. Since the 'not holed' punch card stops the control signal to gate 26, the output of gate 26 cuts off gate 25 and the output thereof is 'zero', in spite of the input 'one' to gate 22.

FIG. 20B, in similar fashion, indicates how 'zero' in to gate 22 results in 'zero' out from both output modules, regardless of the hole or 'no-hole' in the punch card. FIG. 20A is, accordingly, a simplified version of a sequence station in operation, and FIG. 20B is the same station, not in operation.

The system of FIG. 20C sets forth a block diagram of a closed loop control system as it is operational at any one point in time, that is, when any single one of the sequence stations is operational. The selection of which output stations are operational is random, for illustrative purpose only. Thus, only output stations 1, 4, 5, and 7 are operational in accordance with the holed ones of the punch cards 12.

In FIG. 20C the single sequence station 10 is shown to be applying a single output signal through its individual manifold passage 13 to selected ones of the output stations 11 and therefrom, as a single signal from each of the output stations to the process situations 17, each individual to a different one of the output stations. Thereafter, in continuance of the closed control loop, from the individual sensors 18, sensor outputs 29 deliver process condition signals to a coincidence check module 27 for comparison in couples, with the related command signals taken on output branches 28 to the coincidence module 27. If and when all sensor signals agree with their related command signals, the coincidence check module will have an output, feedback 20 to the sequence module (and others) to enable, for example, a sequence step to the next sequence station.

FIG. 21 (broad, block diagram) and FIG. 22 (detail of FIG. 21) set forth a more or less standard sequence control system as a vehicle for illustration of the modifications in accordance with the invention. These modifications combine special features of this invention with the use of punch cards as an operationally fixed program matrix element. Thus, this invention may be applied to any programmed system.

In operation, the first sequence station directs the output stations to which it is connected, to operate. The feedback safety system signals when all operations commanded by this first sequence station have been completed and the second sequence station takes over.

FIG. 21 is thus a development of FIGS. 18 through 20C, showing five full sequence stations each with their individual manifold block passages (13, 19, etc.). There is no cross-contamination between these passages, as inputs to the program matrix (punch cards 12) or as outputs therefrom. While five sequence modules and five output modules are shown, in accordance with the flexible modular concept and structure of this invention, any number of sequence modules may be used with any number of output nodules, in any desired combination.

FIG. 21, further, indicates the coincidence module 27, which compares the output (command) signals, 28 for example, with their related process sensor feedback signals, 29 for example. These coincidence checks are individual to each output, as seen further in FIG. 22 and detailed in FIGS. 27 and 28. When all such paired comparisons check out correctly for all of the outputs of a single sequence station, the feedback 20 is provided from the coincidence module 27 simultaneously to all of the sequence stations and the start module, as an operational clearance therefor.

Further, in FIG. 21, there is indication of a 'DO' repeat module 30 (DO loop, FIG. 26) which is activated by a feedback 31 from a suitable process sensor (not shown) to indicate that the sequence step(s) needs to be repeated. This would be from a process condition other than those directly concerned with the coincidence check. For example, a machine tool might be ordered to run two minutes and coincidence would show it did that, but the depth of cut was insufficient, and feedback to the DO Loop would be activated to repeat the sequence step(s) as many times as necessary. The DO Loop is located wherever needed in the group of sequence inputs, as related to expected problems in a particular process (or energy) situation. The DO Loop is thus fixed in place according to the system application, when needed, and can be connected to cover any one or any sequential group of input modules. The DO Loop connections are shown in FIG. 21 to encompass one sequence station, or two, according to the dotted line connection. In FIG. 22, detailed connections into the sequence module fluidic circuit are shown.

An advance from one sequence station to the next cannot take place unless, if involved, the DO Loop is satisfied. See FIG. 26 for detail of a DO Loop, repeat module as an example of a DO Loop system.

Further, an advance from one sequence station to the next cannot take place unless a 'DONE' signal is applied to the active sequencer station. The 'done' signal is applied, as indicated in both FIGS. 21 and 22, individually to each sequence station. The 'done' signal will turn the active sequence station off and enable the 'advance' or 'run' signal to the next station. The 'done' signal is initiated in the process (not shown), from a situation usually different in kind from the process signals applied to the coincidence check. The 'done' signal may be subject to a process situation under command from the controller, or not, as desired. The 'done' signal may have the same source for application to one or more of the sequence stations, or different sources for different sequence stations. Examples of such sources in machine tools are signals triggered when a slide table reaches the limit of its travel or when a work piece drops off, or the like.

The sequence cycle may be terminated in many suitable ways, for example, by absence of a 'run' signal.

FIG. 22 shows examples of gate system details of sequence modules like module 10, of the output modules 11, the coincidence module 27, the repeat module 30, and the start module 15. These systems, in turbulence amplifier showings, are set forth in FIGS. 23 through 28, discussed hereinafter. Discussion of these figures is taken with reference to the overall showing of FIG. 22.

FIG. 22, further, discloses manual set or reset switches 32 as applied to the sequence modules. Similar switches (not shown) may be applied to the output modules in similar fashion, when needed. In the output modules of FIG. 22, inputs from manifold passages 1 through 8 (three manifold passages are shown) are applied in a group 33 to one of the gates of the first output module. These represent input sequence stations 1 through 8 (three are shown). Inputs from manifold passages 9 through 14 in another group 34 are applied to another of the gates in the first output module. Inputs from manifold passages 15 through 22 are applied in a final group 35 to still another of the gates in the first output module. This overall system contemplates sequence steps from one to 22 or more. The effect of any one signal from any one of the manifold passages is the same. The signal grouping is simply a practical arrangement, since turbulence amplifiers ordinarily are limited to eight transverse control signal inputs to each gate. Refer to FIG. 24 for an example of detail of the circuit of each output module.

Further, in FIG. 22, in the output modules, a group 36 of inhibit controls is applied to one of the gates. These may originate in any desired control parameter to stop the sequence action when necessary. Such parameters could be machine breakdown, lack of workpiece, wrong position of workpiece, wrong chemical feed, and the like.

Again in FIG. 22, the output amplifiers 16 are shown, one for each single output from each single output module. Detail of one form of such amplifier is shown in FIG. 12. The sensors 18 represent anything needed: sensors of temperature, flow, rate, presence or absence of materials or objects, and the like. In suitable, common practice fashion, such sensors are provided with fluidic outputs.

Once more in FIG. 22, feedback from the sensors is applied to the coincidence module 27. See FIGS. 27 and 28 for detail. In the coincidence module, command signals from the outputs of the output modules and feedback signals from the sensors are paired off and compared. If all the pairs match, for one sequence step, output of the coincidence module 27 is applied to fluidic amplifier 37, which may be like the output amplifier 16, to an output, the coincidence feedback 20.

FIG. 22 coincidence module is an exclusive 'OR' gate. See FIGS. 27 and 28. If the compared pairs of signals are all matched, there will be an output.

Finally, with respect to FIG. 22, fluidic indicator lights 38 in the sequence modules, are used to show when a particular sequence module is activated. Such indicators may also be used in the output modules (not shown). See FIG. 29 for detail of this indicator.

SEQUENCE MODULE CIRCUIT

FIG. 23 illustrates one fluidic sequence circuit which may be used to produce a single process output signal from a sequence station module. The elements are fluidic turbulence amplifiers, as gates. There are two output gates A and A', in parallel to provide the volume necessary to feed a manifold passage and whatever pattern of output modules is used.

The FIG. 23 sequence circuit further comprises a coincidence gate (B), a set gate (IN) (C), a done gate (D), a set gate (out) (E), a run gate (out)(F), and a run gate (in)(G). Dotted line connections show potential connections for the DO Loop, repeat module.

The circuit of FIG. 23 is based on operational fluidic gates such as A and A' which are held closed by inhibit controls in one form or another, in simple or complex manner, as associate or peripheral gates, until various set and safety conditions are satisfied.

Accordingly, as in FIG. 23, when the set signal (IN) has been applied, when the coincidence signal is on, when the done signal is absent, and when the run (IN) signal is on, the various gates will interact according to the relations shown, and this sequencer will produce a single process output signal. With these parameters, the sequence system is such that only one sequence station can be operative at any one time.

Figure 1A:
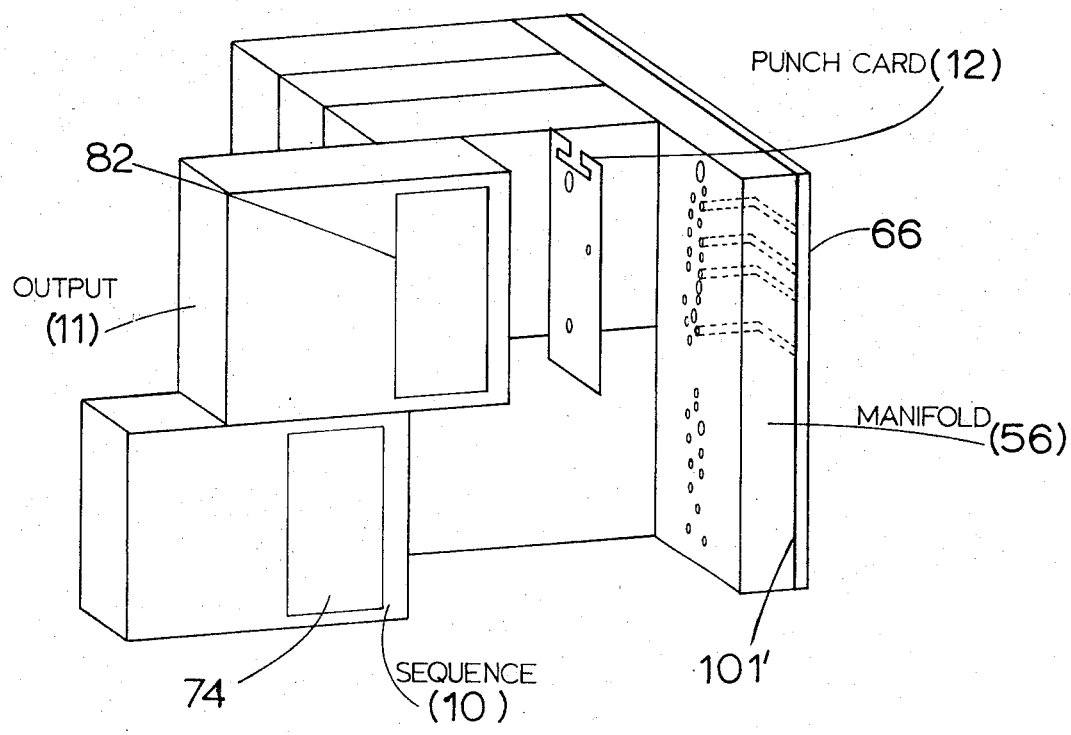
FIG. 1A is a block showing of the assembly of FIG. 1.

The fluidic sequence circuit of FIG. 23 is what is mainly contained in the circuit board 74, FIG. 1A. This circuit board, like its counterpart output circuit board 82, may contain other fluidic passages than those of the sequence or output circuits respectively. Also the sequence and output module blocks 10 and 11 may have many other peripheral and associative fluidic passages, and connections for these are made from and to the manifold block 56. There are, however, only single process signal system outputs from the sequence or output modules.

The circuit of FIG. 23 works on the general basis of inverter combinations wherein an operating gate, like output gate A', has an output signal of 'one' when an inhibit signal(s) is removed therefrom by application of a positive control signal to an inhibit gate(s), like RUN (IN) gate G.

Another sub-system form in repeated use in this circuit is the flip-flop, like SET (IN) gate C in combination with done gate D, wherein safety and positive control is exercised in that one gate must, for proper operation of the circuit, be closed when the other is open, and vice versa for the same gates.

These circuit forms provide the main basis, in combination, for the sequence circuit of FIG. 23, shown here as an example of simple, standard circuit forms used together to provide the operational and safety features needed for the sequence function.

Figure 23A:
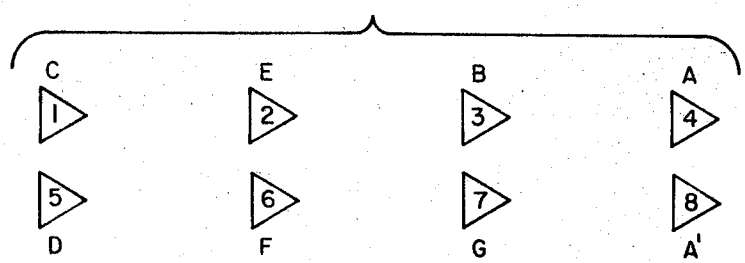

The following sets forth the nature of the sequencer of FIG. 23 in terms of the symbols of FIG. 23A:

| Element description | Input | Output |
| --- | --- | --- |
| (1) Control Flip-Flop (Set Gate (C)). | (1) Auto Set (insures Flip-Flop in proper position to initiate operation).<br>(2) Man Set (A manually operated set control).<br>(3) Flip-Flop hold from element #5. | (1) Control Signal for Auto Set to next stage.<br>(2) Preset executes hold to elements 4 and 8.<br>(3) Flip-Flop Control back to element #5. |
| (5) Control Flip-Flop (Done Gate (D)). | (1) Done—Blocks further operation of circuit after completion.<br>(2) Manual—A manually operated done signal.<br>(3) Flip-Flop hold from element #1. | (1) Control signal to element #6 to control run signal at the next stage.<br>(2) Flip-Flop Control back to element #1. |
| (6) Inverter (Run Gate (OUT) (F)). | (1) See Output #1 from element #5.<br>(2) Holding Sequence Signal from the output of element #7 which is controlled by the incoming run signal. | (1) Run to the next station. |
| (2) Inverter (Set Gate (OUT) (E)). | (1) Confirmation of current stage flip-flop positions from output of element #1.<br>(2) Holding sequence and an execute preset next stage. From output element #7.<br>(3) Latching signal for output from element #3 output. | (1) Preset flip-flops of the next stage.<br>(2) Latching initialization to element #3. |
| (3) Safety Check (Coincidence Gate (B)). | (1) See output #2 of element #2.<br>(2) Coincident signal from external source to assure safety. | (1) See Input #3 of element #2.<br>(2) Output safety inhibit to elements #4 and #8. |
| (7) Run Execute (Run Gate (IN) (G)). | (1) Run from previous stage (element #6 of previous stage). | (1) See input #2 of element #6.<br>(2) See input #2 of element #2.<br>(3) Execute output to elements #4 and #8. |

| Element description | Input | Output |
|---|---|---|
| (4 and 8) Output Signal stages in parallel for volume flow (Output Gates (A+A')). | (1) See output #3 of element #7. (2) See output #2 of element #1. (3) See output #2 of element #3. | (1) Overall output Single signal. |

Supplementing the above listing and referring to FIG. 23A, the first element is the upper left-hand corner and across the top numbering 1, 2, 3, 4, then continuing down at the left-hand corner, across with 5, 6, 7, and 8. Elements 4 and 8 are the output elements.

The sequence module, made of these eight elements, has for its basic inputs the flip-flop composed of elements 1 and 5. These elements are either 1-on and 5-off or 5-on and 1-off. These two elements basically control the output and the functions performed by the sequence module. When the conditions of the flip-flop are 1-on and 5-off, the sequence module has been completed and is locked-up to any signal coming in, except for a set signal. When 1 is off, and 5 is on, there is a condition of possible input-output, depending upon the coincidence signal and the run signal from the previous station.

Element 6 on the diagram is used to sequence the next stage; sequencing meaning to initiate run in the next stage. This element receives its output from the element 5 and inverts that signal so that there is a positive signal output from element 6 to run the next stage. The second input to element 6 is from the run of the previous stage inverted, so that there is a blocking function derived from that signal.

Element 2 is also an inverter used to initiate the set conditions for the next stage, and also to initialize an output to the latching element, which is element 3.

Element 3 is the safety check element which receives inputs from the coincidence signal feedback from the process. A coincidence signal to the safety check element establishes a proceed condition. The lack of coincidence signal will trigger a 1 signal output from the safety check element and suppress execution. The timing of the coincidence signal is important in that the coincidence signal must be there at the time that the run execute signal arrives to this element. If the coincidence signal subsequently is absent, there will be no change in the module because of the locking effect of elements 2 and 3.

Element 7 is used as the run execute element. The signal comes in from the previous stage (actually the output of element 6 from the previous stage), and triggers element 7. In the unfired state, element 7 is a 1 signal which acts as an inhibit both to the output elements 4, 8, and 6. The output of 7 also inhibits element 2 from firing. When the run signal arrives, the output of 7 is cut off to the zero condition. This then removes the inhibit signal from elements 2, 6, 4, and 8. Normally, this would trigger the following actions: a signal would be sent from 2 to the next stage for presetting the next stage and that signal would then be locked in by elements 2 and 3. Station 6 has no effect upon it because the done signal has not yet arrived. The output of 7 will also release the last inhibit from elements 4 and 8. These then will fire, giving the execution output.

Elements 4 and 8 are the output elements which are connected in parallel for the benefit of additional flow. The output from these elements is sent to one or more output stations for a command signal to the process. The inputs to elements 4 and 8 are 3 inhibit inputs. The first one is an inhibit from the run element, element 7, so that the output cannot start before the previous stage is finished. The second inhibit is from element 1. This inhibit acts as a block against any signal coming in out of phase with the previous station; in other words, element 1 cannot have the inhibit signal removed until the previous station has started executing. The third inhibit is derived from the coincidence signal or inhibit safety signal. This one cannot be removed until a coincidence signal arrives at this sequence element at the proper time.

In general terms, the module is a logic function with one process output and a various combination of inputs. The output derives from the combination of a set from the previous stage to initialize the flip-flops and get the elements in the proper condition, followed by a run signal from the previous stage coincident with, or previous to, a safety or coincidence signal. This then will trigger the output. At the end of the process function, a done signal arrives from the process. This comes to element 5, resets the flip-flop to a blocked condition, and fires element 6 to initiate the execution of the succeeding sequence station.

The sequence circuit of FIG. 23 thus runs on an operational trilogy of set, coincidence, and run functions, terminated by a by a done function.

In this vein, the output gates A and A' are subject to the three inhibits of set, coincidence, and run. These same three inhibits are also applied to the set (OUT) gate E.

In the operation of the sequence circuit of FIG. 23 the set (IN) gate C is closed by a set signal. This releases the set inhibit on gate D so gate D is open, now waiting to be closed by the done signal. The set (IN) inhibit is also removed from the set (OUT) gate E, and the set inhibit is removed from output gates A and A'.

The coincidence gate B is closed by the coincidence signal. As a result, the coincidence inhibit is removed from both the output gates A and A', and from the set (OUT) gate E.

Consequently, the only inhibit left on the output gates A and A' is that of run (IN) gate G. This is removed when the run (IN) signal is applied to run (IN) gate G. The result is an output signal at 39.

Simultaneously with this release of the output signal, the final, run, inhibit is removed from the set (OUT) gate E and a set signal is sent to the next station and a latching inhibit is applied to the coincidence gate B. Also, the run (IN) inhibit is removed from run (OUT) gate F.

Thereafter, a done signal to done gate D releases the done inhibit on run (out) gate F, and a run signal is sent to the next station.

The further effect of the done signal is to release the done inhibit on set (IN) gate C. The set (IN) gate C output now again inhibits output gates A and A'. Further, it again latches closed the done gate D and closes the set (OUT) gate E, releasing the latching inhibit of gate E on the coincidence gate B. This in turn renews the latching inhibit of coincidence gate B on the set (OUT) gate E, in situations in which the coincidence signal is absent when the output signal is terminated.

The done signal is necessarily designed as a temporary one, so that when a new set (IN) inhibit signal is applied to gate C, the gate C inhibit on done gate D is released, and the run (OUT) inhibit of done gate D on run (OUT) gate F is renewed, terminating the run (OUT) signal. In this manner the run (IN) inhibit to run (IN) gate C is terminated when set (IN) is applied to the previous sequence station.

In the case of the first sequence station, preceded by the start circuit, FIG. 25, the termination of the coincidence signal results in the termination of the run (IN) inhibit to run (IN) gate C of the first sequence station, when the manual, temporary, set is applied to the start circuit.

Accordingly, the inhibit triad of set, coincidence and run are again established on the output gates A and A'.

The manual switch SW of FIG. 23 is left in center position for no control, automatic position. When applied to gate C, a set (IN) signal is applied at will to any one sequence station. When applied to gate D, a done signal is applied at will to any one sequence station.

OUTPUT MODULE CIRCUIT

The FIG. 24 circuit is that of each of the output modules of FIG. 22, in turbulence amplifier symbol form.

The output gate is released to provide an output signal to the amplifier 16 and thereafter to the process, when the control gate is closed. This providing there is no inhibit signals applied to the output gate.

The control gate is closeable by any one of sequence outputs 1 through 8 as applied to gate H. Such closing of gate H releases inverter gate I to apply a closing signal to the control gate.

Any one of the sequencer outputs 9 through 14 will close gate J to release inverter gate K and thus provide a closing signal to the control gate, thus releasing the output gate, absent inhibit signals thereto.

Any one of sequence outputs 15 through 22 will directly close the control gate, thus to release the output gate, again providing inhibit signals thereto are absent. Indirect operations through gate systems H and I; J and K are used because diffusion gates such as the control gate are physically limited usually to eight control inputs.

In this system, only one sequence output is applied to the output module at any one time, provided it is so enabled by a punch card hole. Any one such output signal can, by itself, actuate the output module to produce its single output signal through the amplifier 16.

START CIRCUIT

In the operation of the FIG. 25 start system 15 the manual set is first temporarily applied to this start system and also to the first sequence stations. This results in a 'zero' run output signal from the start circuit.

The 'start' push button further activates the start circuit. With the coincidence signal present, pushing the start button will activate the output of the start system and produce a Run output signal to the first sequence station.

The start system is organized as follows: an output gate L is inhibited by the manual set signal, and by a signal from an output inhibit gate M. Inhibit gate M is controlled by feedback from output gate L and by a signal from an enabling gate N, which in turn is controlled through a start gate O and a coincidence gate P.

The start system operates as follows: First, the manual set is temporarily applied, to inhibit 'run' going to the first sequence module and to release inhibit gate M so that its output latches in on gate L.

Then the start, P. B. (push button) is activated, applying a temporary inhibit signal to start gate O. If, at this time, there is a proceed signal from the coincidence system to inhibit gate P, then both inhibiting signals on enabling gate N are released. Consequently, the output of enabling gate N now shuts off inhibit gate M, which is otherwise free because there is at this point no feedback from output gate L. Since the manual set signal has been removed from output gate L, and the inhibit signal from gate M has also been removed, an output signal proceeds from output gate L. This output signal is fed back to keep the inhibit gate M closed even though the push button is released to again open start gate O. The output signal from output gate L thus proceeds as the Run input signal to the first sequence station.

DO LOOP REPEAT CIRCUIT

The circuit 30, shown in FIG. 26 and applied at FIG. 22, is activated by a run signal from the previous sequence station to close gate Q, thus releasing gate R providing there is to be a repeat, or releasing gate S when there is to be no repeat and a run signal is to be sent through gate S to the next sequence station.

The determinant of whether there will be a repeat is the nature of the feedback signal indicated at 39, from a special sensor or other selected process or energy situation.

If signal 39 is plus, or present, there will be no repeat. Gate T is closed, and gate S is thus released to provide the next station run signal since the run signal to gate Q has closed gate Q and prevented its output from shutting off gate S.

If signal 39 is zero, or absent, there will be a repeat operation of the sequencer(s) just finished. Zero signal 39 allows gate T to close gate S and prevent the run signal to the following next station (stage). Signal 39, being zero, releases gate R to allow a signal to the repeat station (stage) since the run signal from the previous station (stage) has closed gate Q, releasing its effect on gate R.

COINCIDENCE CHECK EXCLUSIVE 'OR' FLUIDIC GATE

FIG. 27 is illustrative of the disclosure of U.S. patent application of Kinner, Ser. No. 834,784; titled: Laminar Stream Cross-Flow Fluid Diffusion Logic Gate. The abstract of this application is: A fluid logic gate wherein two laminar streams are intersected in a diffusion area, with a control jet applicable to each of the laminar streams upstream of the intersection, with an output from the diffusion area in alignment with each of the streams, on the logic basis of zero output when the control jets are either both on or both off.

Accordingly, as applied to this invention, see FIG. 22, when command matches feedback, a confirming signal is sent to the sequencer modules. Also, when there is no command and no feedback, both inputs to the coincidence device are zero, and since they match, a confirming signal is sent to the sequencer modules, to clear them for action, in the case of start-up, for example.

While the simple concept of this coincidence check device is a matter of pairing off a single command with a single sensor output, as in FIG. 21, it is indicated in FIG. 22 that any one of several commands may be paired off with a single sensor output. This is a useful device for repeating a process step with a sequence step in the middle of a process program without the necessity of returning to the use of a previously operated sequence station.

In FIG. 27, the representation is of two turbulence amplifiers, or gates, with their free-flow paths intersecting in an open, diffusion area. $Pc_1$ is one control pressure from a command signal of the system of this invention. $Pc_2$ is another control pressure from the related process feedback signal. If both controls are absent, the amplifier main streams intersect at 40 and both are thereby diffused. The result is zero output at both $Po_1$ and $Po_2$ (pressure outputs). If both controls are present, there is again zero output at both $Po_1$ and $Po_2$ because of individual diffusion at the control points. If either $Pc_1$ or $Pc_2$ is present, absent the other, the related output, $Po_1$ or $Po_2$, is 'one' and no coincidence signal is sent. See FIG. 28.

In FIG. 28, the overall coincidence check device 27 comprises a combination of an exclusive OR gate 41, a coincidence gate 41 and the amplifier 37. These gates are shown as turbulence amplifier devices, and the amplifier 37 may be like that in FIG. 22, at 16 in the output modules. See also, FIG. 12. When no control signal is applied to the coincidence gate 42, there is an output signal in the line 20 out of the amplifier 37. Thus there is a signal in line 20 when both command and feedback are present, or when both are absent.

INDICATOR LIGHT FLUIDIC SYSTEM

FIG. 29 illustrates the fluidic system of the indicator light(s) 38 of FIG. 22. This is also FIG. 3 of U.S. Pat. No. 3,417,728 to Kinner. The abstract of this patent is:

A cylindrical housing is enclosed by a convex-concave translucent lens at a first end thereof; a colored ball having a diameter slightly less than the cylindrical housing interior diameter is enclosed therein; a fluid pressure supplied to the second end of the cylinder operates to conformably impress the ball against the inner concave face of the lens, thereby illuminating the lens for large viewing angles about the housing center line; pressure aspiration at the second end of the cylindrical housing operates to withdraw the colored ball from the lens, thereby darkening the lens; a constant aspiration bias may be employed in conjunction with a controlled pressure signal to actuate the indicator in response to a fluidic binary signal.

FIG. 29 shows an indicator 43, an aspirator 44, an air supply 45, and a signal input 46.

STRUCTURE

FIGS. 1 – 17 and 30

The structure of this invention is modular. Each sequence step involves one sequence module and one or more output modules, joined through a manifold block. Air supplies, and peripheral connections and interconnections are fed to these modules through passages in the manifold block.

Each module is a snap-plug-in device with respect to the manifold, fluidic circuit boards are readily removably plugged into the sequence modules and the output modules in the sense of sliding a laminated plate circuit board against a connector face under the holding bias of groups of spring fingers, and program punch-cards are readily inserted and removed in and from fixed operating location between the manifold block and the output modules.

ASSEMBLY STRUCTURE

FIGS. 1 Through 2C, and 30

FIGS. 1 and 30 are overall perspectives of sequencer assemblies. FIG. 1 is limited to four stages of sequencing in keeping with the circuit systems showings in other Figures. FIG. 30 is an extension of FIG. 1 illustrating that many sequence steps may be used, of the order of 15, 22, or more. In these drawings, each of the lower panel modules represents one sequence station. The number of upper horizontal panel (output) modules need not match the number of lower horizontal panel sequence modules.

FIGS. 1 and 30 show sequence modules exemplified at 10, with indicator light 38, stage number indication 47, and air supply pressure indicators, at 48 for 5 pounds pressure for small fluidic circuit needs, with a control button therefor at 49; and at 50 for 50 pounds pressure for large needs, such as output amplifiers, with a control button therefore at 51. Each module may have a control button 52, which, with the stop and start buttons may have suitable connections into a circuit such as shown in FIG. 22. The controls shown are illustrative only.

FIG. 1A, by simple block schematic, illustrates a modular structure in broad explanation of the structure of FIG. 1. One sequence station, 10, is partially removed from the manifold block, as is one output station, 11. A punch card, 12, is shown as between the manifold and the output module. Circuit boards 74 and 82 are indicated as mounted respectively on the sequence and output blocks 10 and 11.

FIG. 2 illustrates structural relation in further explanation of FIGS. 1 and 1A in that the sequence modules such as 10 are formed as narrow rectangular blocks, long edge mounted on a base 54 by dove-tail like tongue and slot tracks 55. The manifold block 56 is also in the form of a narrow rectangular block, long edge mounted transversely of the base 54 and the tracks 55. The manifold 56 is similarly mounted on a top, cover, support 57 with downwardly facing mounting tracks 58 on which the output modules 11 are hung extending down toward the top of the sequence modules 10, but without engagement therewith. As one example of assembly, the modular structure disclosed herein mounts both sequence and output modules on the same side of the manifold block, one above the other. Details of these blocks are set forth hereinafter.

FIGS. 2A, 2B, and 2C illustrate the flexibility of assembly and application of this invention. Any number of sequence blocks 10 may be used with any number of output blocks 11, through the manifold block 56 and by way of program matrix punch cards 12.

FIG. 2A shows an assembly form with the sequence and output blocks on opposite sides of the manifold block. FIG. 2B shows both sequence and output blocks on the same side of the manifold block.

FIG. 2C illustrate that many outputs 11 and many process sensors 18 may be used simultaneously with a single sequence block 10.

Accordingly, flexibility of assembly and application lies in the building block module structure of add or remove blocks as desired, in the removable punch cards, the removable circuit boards, 74, 82, and the choice, location, and number of process sensors 18, in conjunction with simultaneous coincidence check of their outputs in the coincidence unit 27.

MODULE AND ASSOCIATED STRUCTURE

FIG. 3 illustrates the power fluidic connection between an output module 11 and the manifold block 56. This is a 50 pound air supply which is directed into the manifold from a source, thence into the output modules and directly to the output amplifiers as power for process control actuators.

A passage 60 in the manifold block 56, to which the passage through the output module boss 59 is connected, is formed with an enlarged chamber 61 containing a coil spring 62, biased against a valve plug 63. The plug 63 seats on an O-ring 64 which lays in a countersink 65 at the open end of the chamber 61. The O-ring 64 is held in by a manifold block cover plate 66 with an opening therethrough to admit the boss 59. When the bodies are joined, the boss 59 pushes the valve plug 63 back, compressing the spring 62 to open the passage through the O-ring 64 and around the valve plug 63. This connection is held in place against the spring 62 by module-base snap-in assembly as in FIGS. 4, 4A, and 4B. Each punch card 12 is held in place and located by mounting on the boss 59, on the top base mounting track 58, and between the output module and the manifold. FIG. 4 shows the bottom of a module and the support base 54 and FIGS. 4, 4A, and 4B illustrate the mounting of a sequence module on the support base 54 and mounting track 55, see FIG. 2. The base 54 has an upwardly facing cross-slot 67 at its outer end. The module 10 has a snap-fastener 68, mounted on the module by a snap-spring 69. When the module is in place, the snap-fasteners of FIGS. 4A and 4B are in place in base slot 67 as shown in FIG. 4A, to lock the module in against the manifold. A simple finger-lift releases the snap-fastener 68. This is one reason why the modules of this device are easily replaceable, in keeping with the flexibility of the variety of use applications of the overall system of this invention. Similar structure is used to mount the output modules 11 on and from the top support 57 and track 58.

FIGS. 5, 6, and 7 are various views of a sequencer module 10. The module is mounted on a base 70 with a mounting recess 71 for receiving the track 55, FIG. 2, of the overall mounting base 54. A front panel upright 72 supports the indicator light 38, the identification panel 47, and the set, re-set switch 52. At the rear of module 10, an upright pneumatic passage and connector block 73 has the sequence fluidic circuit board 74 removably mounted vertically thereagainst, held by a group of spring fingers 75. Flexible pneumatic tubes, exemplified at 76, operatively connect the various elements. In FIG. 7, the pneumatic system block 77 is shown as the operating system for the indicator light 38, see FIG. 28.

The back face of FIG. 5 is the connector face with various openings for matching with suitable openings in the manifold block. All fluid passages originate in the manifold block, are connected as inputs to the modules as called for, and the module outputs, the single circuit signal in particular, are returned to the manifold and reconnected from there, as required. Circuits such as the start, DO Loop, and coincidence system are not specifically shown. They may be mounted outboard and connected through the manifold, or inboard, in suitable location and like manner as are the circuit boards 74. The switch 52 has three positions, as shown, FIG. 6, and relates to switch 32, FIG. 22.

FIG. 8 illustrates a circuit board such as 74 in FIG. 6. No specific fluidic circuit is shown. The sandwich structure is illustrated, with turbulence amplifier configurations and supply and other connecting passages broadly indicated in an internal layer 78. Vents 79 are provided in the outer layer 80, for escape of diffused air from the turbulence amplifiers. An example of such circuit board sandwich layered construction is shown in U.S. Pat. No. 3,416,551, to Kinner.

FIG. 9 shows that the circuit board 74 is pneumatically sealed to its support 73 under the action of spring fingers 75, by means of a sealing pad 81 between the circuit board 74 and its support 73, with air passages therethrough.

FIGS. 10 and 11 illustrate an output module such as 11 in FIG. 22. It is much like the sequence module 10, except that its circuit board 82 has a different circuit within it, see FIG. 22. Its single signal output goes to the amplifier 16 and from there via output 83 to the process through the manifold. The rear face 84, FIG. 11, is more involved with passages, since it must admit the possibility of connection from all manifold sequencer passages. Also, the punch card 12 is laid against the face 84 (not shown) as a dividing wall between the face 84 and the manifold block 56, located by mounting on the support track and over the high air supply boss.

Beyond this, as in FIGS. 10 and 11, the output module is provided with a top base 85 and mounting track receiving slot 86, with a depending front panel 87 with indicator light 38, identification panel 88 and switch 89. A fluid passage and support block 90 receives the output module circuit board 82, held thereagainst by spring fingers 91.

The output module amplifier 16 is shown in FIG. 12, and may also be used as the coincidence amplifier 37, FIG. 22.

In FIG. 12, the amplifier 16 comprises a housing 92 with power inlet at 93 and power outlet at 94 separated by valve seat 95. The control signal input is at 96, wherein the input pneumatic signal is applied to a diaphragm 97 to close a nozzle 98 and shut off power bleed to atmosphere through vent 99 which otherwise travels from the power input 93 up through the valve and through the nozzle 98. With the nozzle 98 thus closed, back pressure moves the valve body 100 down to open the valve at the area of the seat 95 and power passes from the input 93 to output 94.

FIGS. 13, 13A, and 13B illustrate the assembly comprising the manifold block with a main body 101, cover plate 66, and a selectively perforated connector plate 101' between the main body and the cover plate. A few of the possible, horizontal manifold passages 102 are shown. Each of these is individual to a different one of the sequence modules, such as 10. An operating signal from the sequence station 10 is directed through the manifold body 101, through the plate 101' and into a vertical passage 66' as a slot on the inner wall of the cover plate 66. From here the signal is directed back through the plate 101' to the manifold horizontal passage which is individual to the particular sequence station being used, and, from there, according to punch card hole selection, to the output modules 11. The output signals from the output modules are then sent through the manifold body to the process, as exemplified by one signal, arrow 11'. FIGS. 13A and 13B, further show details of the support mounting of the output modules and punch cards. An add on manifold block 56' is shown for end plug-in assembly to the block 56 when extension of the manifold block is needed to accommodate more modules.

FIGS. 14 and 15 are rear face and edge views of the manifold body 101 and the manifold block 56, respectively. The various openings are illustrative only, not necessarily related to any one overall sequence system. High and low air supply passages are shown at 103 and 104 respectively. Manifold transverse passages individual to each input module are shown in groups. Sequencer passages 1 – 8 (input modules 1 – 8) are indicated at 105; 9 and 10 at 106; 11 – 14 at 107; and 15 – 22 at 108. FIG. 15 as an edge vertical section, shows the layered construction of the manifold block and its mounting, top and bottom, to the support structure.

FIGS. 16 and 17 illustrate panel card forms 12, to point out that while individual cards as in FIG. 17, are used ordinarily, the concept is the same, if less flexible, with a single card as in FIG. 16. In these Figures, X indicates no hole; O indicates a hole. Scanning is accomplished by sequencing from the first input module line of potential holes, arrow 109, to the second input module line of potential holes, arrow 110, and so on vertically down the cards.

FIGS. 16 and 17 are both set up to read that input sequencer number 1, arrow 109, is connected to output module B and not to output modules A and C. Sequencer number 2 is connected to output module A but not to B and C. The last, bottom line of scanning shows connection to output modules A and C, but not to B.

There may be 22 or more such vertical scanning steps, each selective from 22 or more horizontal choices of output modules. Or two inputs and 22 outputs - or any combination.

This invention therefore provides a highly flexible modular sequencer system with operationally fixed program matrix, operationally fixed inputs and outputs to this matrix, and sequential program scanning with no moving parts, only changes in fluidic pressures and flows, with no cross-talk or fluidic interconnection between individual sequencer-output operating systems and with feedback from the process or energy situation(s) function.

As many embodiments may be made of the above invention and as changes may be made in the embodiment set forth above without departing from the scope of the invention, it is to be understood that all matter hereinbefore set forth and in the accompanying drawings is to be interpreted as illustrative only and not in a limiting sense.

I claim:

1. A fluidic sequence programmer or controller comprising a series of sequence modules, a series of output modules, a multiple manifold unit between said sequence modules and said output modules, and replaceable program matrix means operationally fixed between said manifold unit and said output modules, said manifold unit having a separate manifold passage individually connected to each of said sequence modules, each of said output modules having multiple inputs potentially connectable to said various manifold passages, and said program matrix means comprising a group of series of potential openings with each of said series of potential openings individually related to one of said manifold passages as reading means determinative of which of said output module inputs is connected to each of said manifold passages.

2. A sequence controller according to claim 1, wherein said program matrix means is in the form of punch card structure.

3. A sequence controller according to claim 1, wherein said program matrix means is in the form of individual punch cards, one for each of said manifold passages.

4. A sequence controller according to claim 1, including a repeat system operative with respect to selected ones of said sequence modules, and responsive to effects produced by the outputs of some of said output modules to effectuate a choice between an advance and a repeat, in the sequence operation of said controller.

5. A programmer according to claim 1, wherein said sequence modules are operable one at a time in a determinable manner.

6. A sequence controller according to claim 1 for use in process or energy control, wherein said output modules supply an output signal to the process or energy to be controlled, with sensor means provided in selected locations with respect said process or energy to respond to selected situations of said process or energy, and signal connection means from said sensor means to said controller as a function in the operation of said controller.

7. A sequence controller according to claim 6, wherein comparison means is provided in said sensor signal connection means to determine coincidence as between said output modules signals and said sensor response.

8. A sequence controller according to claim 6, wherein said sequence modules are connected for sequential step actuation in response to signals from said sensor means.

9. In a process or energy control device, fluidic program and control operating system means for said process or energy, comprising control initiating sections, control executing sections, a readily removable program matrix operationally between said initiating and executing sections, said matrix containing punch card structure comprising a group of series of potential holes, each series individual to one of said executing sections, said matrix and sections all being fixed in the sense of being without relative movement with respect to each other during operation of said system, means responsive to a selected situation in said process or energy, and means connecting said responsive means to at least one of said control initiating sections for carrying signals to change the operation of said system in accordance with said process or energy situation.

10. A fluidic system according to claim 9 including coincidence means connected to compare outputs of said control executing sections with signals from said responsive means.

11. A fluidic system according to claim 9, wherein said control initiating sections are connected in sequence and sequentially operable in response to signals from said responsive means.

12. A fluidic system according to claim 9, wherein said punch card structure is subject to fluidic scanning by signals at least indirectly from said process or energy responsive means.

13. A fluid system for reading a removable information matrix of fluid passages comprising, a fluid output system of readout passages,
   for fixed output operating relation to said information matrix in the sense of being without relative movement with respect thereto,
   each of said readout passages being individual to one of said matrix passages, on an isolated gating basis without feedback and without cross-comtamination between said readout passages,
   means responsive to output signals from said readout passages for producing operating signals representative of the information in said information matrix,
   means for fluid input scanning said information matrix to initiate said output signals by directing fluid through said passages in said information matrix,
   said means for fluid scanning comprising a series of input passages for fixed application to one side of said information matrix, and means for sequentially directing fluid to said input passages,
   said means for sequentially directing fluid to said input passages including sensor means responsive to at least one situation of process or energy control responsive to said operating signals, and feedback connection means from said sensor means,
   said sequence means including coincidence check means responsive to said sensor means and said output signals for inhibiting the operation of said sequence means.

14. A fluid system according to claim 13, wherein said information matrix is in the form of punch card means.

15. A fluid system according to claim 13, wherein said output system includes output modules, and said information matrix comprises a punch card individual to each of said output modules.

16. A fluidic sequence controller comprising a series of sequence modules, a series of output modules, a multiple manifold unit between said sequence modules and said output modules, and replaceable program matrix means operationally fixed between said sequence modules and said output modules, and with respect to said matrix and said modules,
   each of said sequence modules having an output, said manifold unit having a manifold passage individual to each of said sequence modules with each passage connected to receive said output from the sequence module to which each passage is individual,
   said output modules each having an output, and multiple inputs, with each of said output module inputs potentially connectable to a different one of said manifold passages,
   said program matrix means having potentially several series of openings with each of said openings series selectively individual to a different one of said manifold passages as reading means determinative of which of said output module units is connected to each of said manifold passages and consequently to each of said sequence modules,
   wherein said controller is for process or energy control, with sensor means provided in selected locations with respect said process or energy to respond to selected situations of said process or energy, and feedback means from said sensor means to said controller as a factor in the operation of said controller,
   comparison mean in said feedback to determine coincidence as between the output of said controller and said sensor response,
   said sequence modules being connected in sequence and sequentially operably in response to said feedback,
   a monitor system operative with respect to selected ones of said sequence modules, and responsive to effects produced by the output of one of said output modules to effectuate a choice between an advance and a repeat, in the sequence operation of said controller,
   said sequence modules each including a replaceable fluidic sequence circuit board, and said output modules each including a replaceable fluidic output circuit board, and
   said controller comprising a plug-in unit assembly for multiple module repeatable alignment upon assembly and reassembly.

17. In a fluidic sequencer control system for process or energy, wherein a removable sequence program matrix is operationally fixed with respect to its output and with respect to a scanning input thereto,
   a building block assembly of a manifold block form with a plurality of individual manifold passages therein,
   at least one sequence station block form with plug-in assembly means to said manifold block form including a fluid connection to one of said passages individual to said sequence station in said manifold block form, and
   a plurality of output block forms with plug-in assembly means to said manifold block including fluid connections from each of said output block forms to at least one of said sequence station block forms through said passage in said manifold block form,
   with said program matrix mounted between said manifold block form and said output block forms blocking said connections, said fluid connections becoming actuality when a program hole is provided in said matrix between one of said output block forms and one of said manifold passages.

18. A sequencer control system according to claim 17 wherein a single output from each of said output block forms is applied to control one or more process or energy situations, wherein sensors are applied to said situations, and wherein the outputs of said sensors, singly or in concert, are applied to said control system to operatively affect said system in functions such as sequence step actuation.

19. A sequencer control system according to claim 18, wherein a sequence station repeat control system is input connected for response to the output of at least one of said sensors, and output connected to reactivate at least one of said sequence stations.

20. A sequence control system according to claim 18, wherein comparison means is provided in said outputs of said sensors to compare said outputs with related command signals to said process or energy situations, and the output of said comparison means is applied to said control system in representation of said signals from said sensors and wherein a sequence station repeat control system is input connected for response to the output of at least one of said sensors, and output connected to reactivate at least one of said sequence stations.

21. A sequencer control system according to claim 18 wherein said sequence step actuation results in a fluidic scanning step applied to said scanning input of said program matrix.

22. A sequence control system according to claim 18, wherein comparison means is provided in said outputs of said sensors to compare said outputs with related command signals to said process or energy situations, and the output of said comparison means is applied to said control system in representation of said signals from said sensors.

23. A sequencer control system according to claim 22, wherein said comparison means is a fluidic coincidence module including an exclusive OR turbulence amplifier.

24. In a fluidic sequencer control system for process or energy, wherein a sequence program holed matrix is operationally fixed between and with respect to its output and to a scanning input thereto, a sequencer module, and output module, and a manifold between said modules, said modules being plug-in mounted with said manifold, said program matrix comprising readily removable punch-card means including program hole groups determinative of fluidic connections to individual portions of said output module, said sequencer module including a readily removable sequencer fluidic circuit board, and said output module including a readily removable output fluidic circuit board, whereby said sequencer control system is highly flexible as to different applications to process or energy control, and as to rapid and simple changes from one such application to another.

25. A sequencer control system according to claim 24, wherein multiple sensors are selectively applied to controlled situations of said process or energy as a further element of application flexibility of said control system, the response of said sensors being applied to said control system to effect operational changes therein.

* * * * *